United States Patent
Fang et al.

(10) Patent No.: US 11,800,497 B2
(45) Date of Patent: Oct. 24, 2023

(54) FRAME REPLICATION AND INTERFACES FOR TIME SENSITIVE NETWORKING

(71) Applicant: Intel Corporation, Santa Clara, CA (US)

(72) Inventors: Juan Fang, Portland, OR (US); Dave Cavalcanti, Portland, OR (US); Laurent Cariou, Portland, OR (US); Dibakar Das, Hillsboro, OR (US); Mikhail Galeev, Beaverton, OR (US); Wey-Yi Guy, Beaverton, OR (US); Javier Perez-Ramirez, North Plains, OR (US); Susruth Sudhakaran, Beaverton, OR (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 147 days.

(21) Appl. No.: 17/134,018

(22) Filed: Dec. 24, 2020

(65) Prior Publication Data
US 2021/0120552 A1    Apr. 22, 2021

Related U.S. Application Data

(60) Provisional application No. 62/983,047, filed on Feb. 28, 2020, provisional application No. 62/976,688, filed on Feb. 14, 2020.

(51) Int. Cl.
*H04W 72/0446* (2023.01)
*H04W 28/02* (2009.01)
(Continued)

(52) U.S. Cl.
CPC ......... *H04W 72/0446* (2013.01); *H04L 69/22* (2013.01); *H04W 28/0268* (2013.01); *H04W 28/06* (2013.01); *H04W 80/02* (2013.01)

(58) Field of Classification Search
None
See application file for complete search history.

(56) References Cited

U.S. PATENT DOCUMENTS

| | | | | |
|---|---|---|---|---|
| 2004/0143680 A1* | 7/2004 | Latvala | ................. | H04L 69/324 709/248 |
| 2004/0264488 A1* | 12/2004 | Yoon | ...................... | H04W 8/04 370/412 |

(Continued)

FOREIGN PATENT DOCUMENTS

| | | | |
|---|---|---|---|
| EP | 2028794 | * | 2/2009 |
| WO | WO2013015114 | * | 1/2013 |
| WO | WO2016015753 | * | 1/2016 |

*Primary Examiner* — Andre Tacdiran
(74) *Attorney, Agent, or Firm* — Eversheds Sutherland (US) LLP

(57) ABSTRACT

This disclosure describes systems, methods, and devices related to wireless time sensitive networking. A device may identify, using an 802.3 protocol stack, an 802.3 frame received from a second device using a wired Ethernet connection, and extract, using the 802.3 protocol stack, a redundancy tag from the 802.3 frame, the redundancy tag including a sequence number. The device may generate, using an 802.11 protocol stack, an 802.11 frame with a subnetwork access protocol (SNAP) field, the SNAP field including an organizationally unique identifier (OUI) and the sequence number, the OUI including an indication of an Ethertype protocol. The device may send the 802.11 frame using a wireless connection.

14 Claims, 22 Drawing Sheets

(51) Int. Cl.
*H04L 69/22* (2022.01)
*H04W 80/02* (2009.01)
*H04W 28/06* (2009.01)

(56) References Cited

U.S. PATENT DOCUMENTS

| | | | |
|---|---|---|---|
| 2006/0165073 A1* | 7/2006 | Gopinath | H04W 48/04 370/328 |
| 2007/0121529 A1* | 5/2007 | Meier | H04L 12/4625 370/256 |
| 2007/0159983 A1* | 7/2007 | Eglin | H04L 45/00 370/254 |
| 2009/0073990 A1* | 3/2009 | Patil | H04L 45/586 370/396 |
| 2013/0329557 A1* | 12/2013 | Petry | H04L 41/00 370/235 |
| 2016/0127135 A1* | 5/2016 | Balasubramanian | H04L 12/10 713/300 |
| 2017/0064046 A1* | 3/2017 | Yamaguchi | H04L 69/163 |
| 2017/0214774 A1* | 7/2017 | Chen | G06F 13/385 |

* cited by examiner

FRAME REPLICATION AND INTERFACES FOR TIME SENSITIVE NETWORKING

CROSS-REFERENCE TO RELATED APPLICATIONS

This application is related to and claims priority to U.S. Provisional Patent Application No. 62/983,047, filed Feb. 28, 2020, and to U.S. Provisional Patent Application No. 62/976,688, filed Feb. 14, 2020, which are hereby incorporated herein by reference in their entirety.

TECHNICAL FIELD

This disclosure generally relates to systems and methods for wireless communications and, more particularly, to wireless time sensitive networking.

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1A:
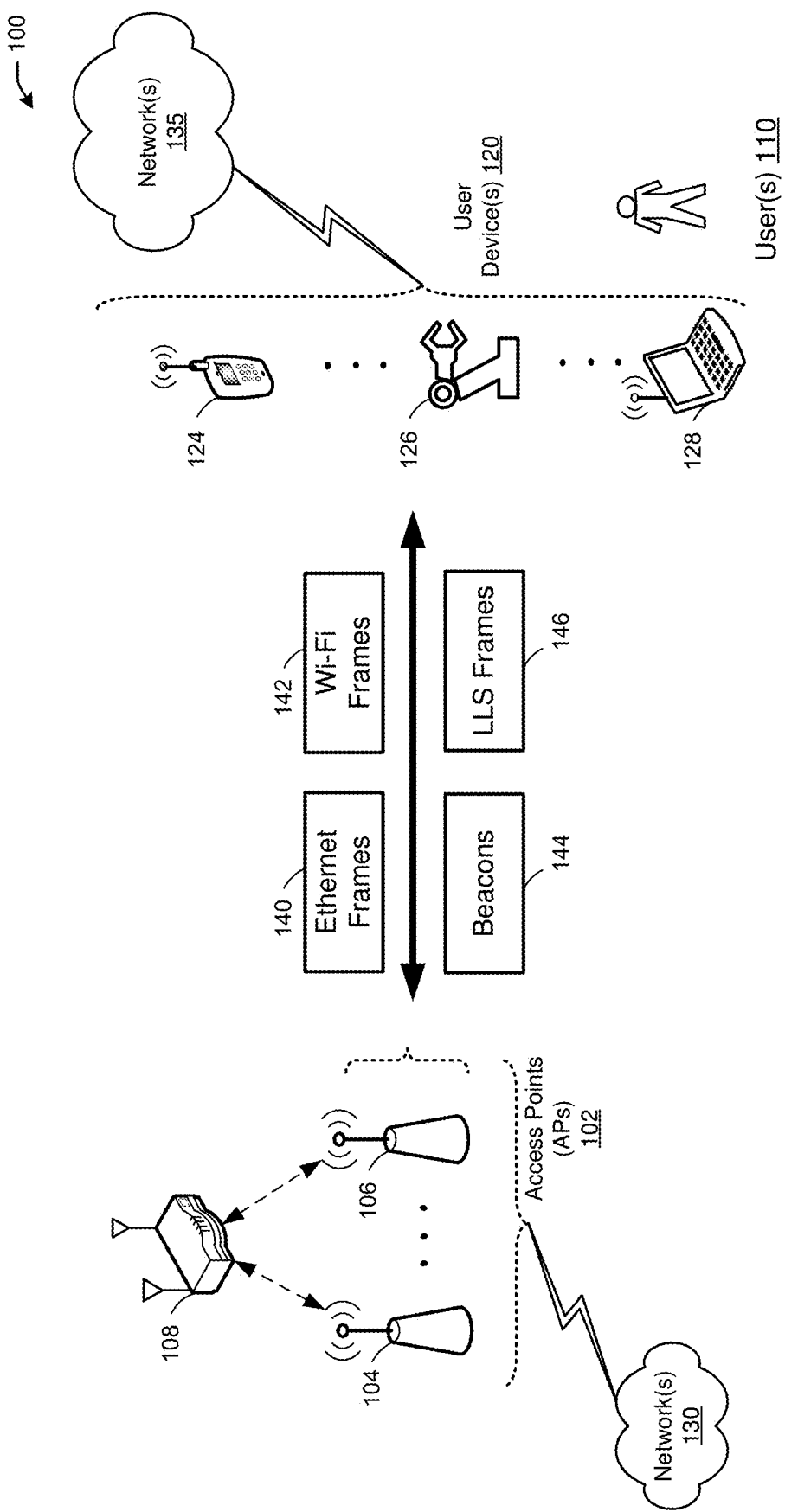
FIG. 1A is a network diagram illustrating an example network environment, in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

The IEEE 802.1 time-sensitive networking (TSN) standards are being developed to enable time synchronization, guarantee latency and high reliability through bandwidth reservation, time-aware scheduling and redundancy. However, many of the TSN standards have been restricted to wired (Ethernet) networks. Enabling time-critical industrial applications over wireless links would add value and open up new markets, such as software-defined machines and factories. Frame replication and elimination was defined in the IEEE 802.1cb standard to enable high reliability in TSN, which was defined for wired (Ethernet) networks. In the future, wired and wireless (e.g., Wi-Fi-based) links are expected to be part of the same network, therefore there is a need to extend the existing redundancy mechanisms from Ethernet to Wi-Fi links.

The Parallel Redundancy Protocol (PRP), High-availability Seamless Redundancy (HSR), and IEEE 802.1CB technical standard have defined redundancy protocols and may be used over TSN to achieve a high reliability. One challenge for Wi-Fi technology is to support TSN and Real-Time Applications (RTAs), which may require high reliability with low-bounded latency and jitter. Enabling redundancy (e.g., the transmission of multiple redundant packets) in Wi-Fi communications to support RTA may allow for high reliability and low-bounded latency and jitter.

To enable redundancy for TSN application in Ethernet-based networks, the 802.1cb, 802.1Qcc and 802.1Qca standards need to operate jointly. 802.1Qcc defines a fully centralized configuration model that allows all-knowing, centralized software controller to receive stream requirements from talkers and listeners and to directly configure the relevant bridges to meet those requirements. 802.1Qca defines the path control and reservation, and working with the 802.1Qcc enables redundancy path selection and reservation from the talker to the listener based on the QoS requirements and also the network information reported from the end devices and the bridges. To indicate the selected path information for the frame forwarding, an 802.1Q tag with virtual local area network (VLAN) identifier (ID) information is inserted into an 802.3 Ethernet frame. As a result, when a relay receives a frame, the relay may rely on the VLAN ID information to identify on which port the relay should forward the received packet. 802.1cb specifies procedures, managed objects and protocols for bridges and end stations that provide, 1) Identification and replication of frames, for redundant transmission; 2) Identification and elimination of duplicate frames, for redundant reception. To identify duplicated (e.g., redundant) frame, a redundancy tag with sequence number information is added in the medium access control (MAC) header of an 802.3 Ethernet frame. As a result, when an end device or the relay receives a new frame, the end device or relay may rely on the destination MAC address and the sequence number information indicated in the redundancy tag to determine whether it is a frame it has received before. If the frame is a duplicated frame, the duplicated frame may be eliminated, and no further process will be initiated.

However, Ethernet frames and Wi-Fi frames use different formats and interfaces defined by different technical standards. For example, an IEEE 802.11 data frame may include a Sequence Control field for sequence number information (e.g., as part of a MAC header). However, the Sequence Control field is used for point-to-point (e.g., link layer) transmission. A sequence number field for end-to-end frame replication and elimination as used in Ethernet communications may be required for a Wi-Fi link to integrate the Wi-Fi and Ethernet links as part of a broader TSN infrastructure that supports path redundancy based in the 802.1CB standard. While a subnetwork access protocol (SNAP) field is defined by the IEEE 802.11 standard for Wi-Fi communications, the Wi-Fi standard currently does not include the redundancy mechanism for Ethernet communications.

Therefore, there is currently no indication of Ethernet frame redundancy in Wi-Fi frames, and no configuration of the interfaces that allows for the use of Ethernet frame redundancy when sending a frame over a wireless communication link using Wi-Fi.

In addition, wireless communications increasingly are using multi-link devices. A station device (STA) may refer to a logical entity that is a singly addressable instance of a medium access control (MAC) and physical layer (PHY) interface to the wireless medium (WM). A communication link (or just "link") in the context of an IEEE 802.11 medium access control (MAC) entity, may refer to a physical path consisting of exactly one traversal of the wireless medium (WM) that is usable to transfer MAC service data units (MSDUs) between two STAs.

In multi-link communications, a multi-link device (MLD), also referred to as a multi-link logical entity (MLLE), may refer to a device that has more than one affiliated STA and that has a medium access control (MAC) layer (e.g., of a communication layer stack) service access point (SAP) to a logical link control (LLC), which may include a MAC data service. An access point (AP) MLD (A MLD) may refer to an AP device, where each STA affiliated with the STA MLD is an AP. A non-AP ML device (non-AP MLD) maybe an A MLD, where each STA affiliated with the MLD is a non-AP STA. A MLD may be considered a logical/virtual entity with multiple STAs (e.g., AP STAs or non-AP STAs), and each STA concurrently may use separate communication links with corresponding STAs of another MLD. In this manner, a MLD may communicate over multiple communication links.

A Wi-Fi network (e.g., AP and clients) currently has no mechanism or interface for applications (e.g., upper layers of the communication stack) to request/negotiate a service that delivers data frames with low worst case latency/jitter guarantees. The IEEE 802.11 standard defines admission control procedures (e.g. ADDTS Request/Response), but there are no data delivery requirements and performance expectations including worst case latency and packet delivery ratios in the existing QoS interfaces in the 802.11 specification. In particular, there is no standard management/control plane interface that enables time-sensitive applications running on a client device or edge server to negotiate a low latency service with a Wi-Fi network.

Hybrid coordination function (HCF) controlled channel access (HCCA) introduced fully scheduled channel access and admission control for traffic streams, but there is no specific data delivery expectations and negotiation including worst-case latency and reliability;

Existing 802.11 admission control based on ADDTS Request/Response frames and TSPEC information elements do not include worst case latency, jitter and PDR requirements for the traffic flow.

Existing 802.11 QoS mechanisms (Admission control and TSPEC) are defined based on the assumption of STA to STA negotiation is required for each traffic stream. In 802.11be, the new concept of Multi-Link Device (MLD) enables multiple STAs to operate under a single MAC interface, and the existing QoS mechanism will be inefficient as they need to be executed per STA.

Trigger-based access enabled scheduled operation in 802.11ax can help schedule and provide a low latency service, but it has no well-defined interface for application to provide their low latency service needs and receive a confirmation of service from the network.

Scheduled access is also supported in the 802.11 directional multi-gigabit (DMG)/enhanced DMG (EDMG), but no clear low worst case latency service currently can be explicitly negotiated.

Example embodiments of the present disclosure relate to systems, methods, and devices for frame replication and frame elimination over Wi-Fi for ultra-reliable wireless time sensitive networking, and for a low latency service interface for 802.11be.

In one embodiment, a wireless time sensitive networking system may extend the existing redundancy mechanisms from Ethernet TSN to Wi-Fi-based TSN for ultra-reliable low latency applications.

In one or more embodiments, a wireless time sensitive networking system may facilitate one or more components: Protocol enhancements for carrying a redundancy tag over 802.11 networks using the SNAP field of the 802.11 frame.

A new wireless TSN/802.1CB compatible function for 802.11 devices that operates on top of the 802.11 MAC layer and performs TSN encapsulation/decapsulation for frame duplication/elimination and other required behavior to enable 802.1CB redundancy over 802.11 links. This function may be implemented as part of the 802.11 MAC layer (firmware).

In one embodiment, a wireless time sensitive networking system may extend existing redundancy mechanisms from Ethernet to Wi-Fi links for ultra-reliable time-sensitive applications enabling flexibility and mobility for many time-critical industrial systems (e.g. mobile Robots, AGVs, controllers, etc.).

In one or more embodiments, a low latency service interface system may facilitate a new low latency service interface to the higher layer traffic streams that enables prioritization, delivery of time-sensitive frames within a worst-case latency budget (and jitter) with a negotiated packet delivery ratio (PDR) in 802.11 networks.

In one or more embodiments, a low latency service interface system may include interface inputs/outputs and requirements for applications using the service and 802.11 devices offering it. The proposed interface operating on top of the new 802.11be MLD entity may minimize the overhead required to establish time-sensitive traffic streams, as a single exchange may be needed independent of the number of underlying STAs.

The proposed interface will enable 802.11 networks to provide bounded latency and jitter with high reliability in managed scenarios, such as enterprise, factories and some homes deployments. This capability is expected to be one of the new features in 802.11be and may enable TSN services and ultra-reliable low latency communications (URLLC) over 802.11be.

Although this disclosure focuses on Wi-Fi, the low latency service interface to the upper layers (application) described herein can be extended to other network technologies, such as 5G.

The solution may be a service-based solution and may not require kernel driver level changes, meaning it may not be device-dependent and could apply to all standard compliant devices. The solution can be implemented as part of a middleware that could be enabled and upgraded/updated without impacting the user applications.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1A is a network diagram illustrating an example network environment, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 9:
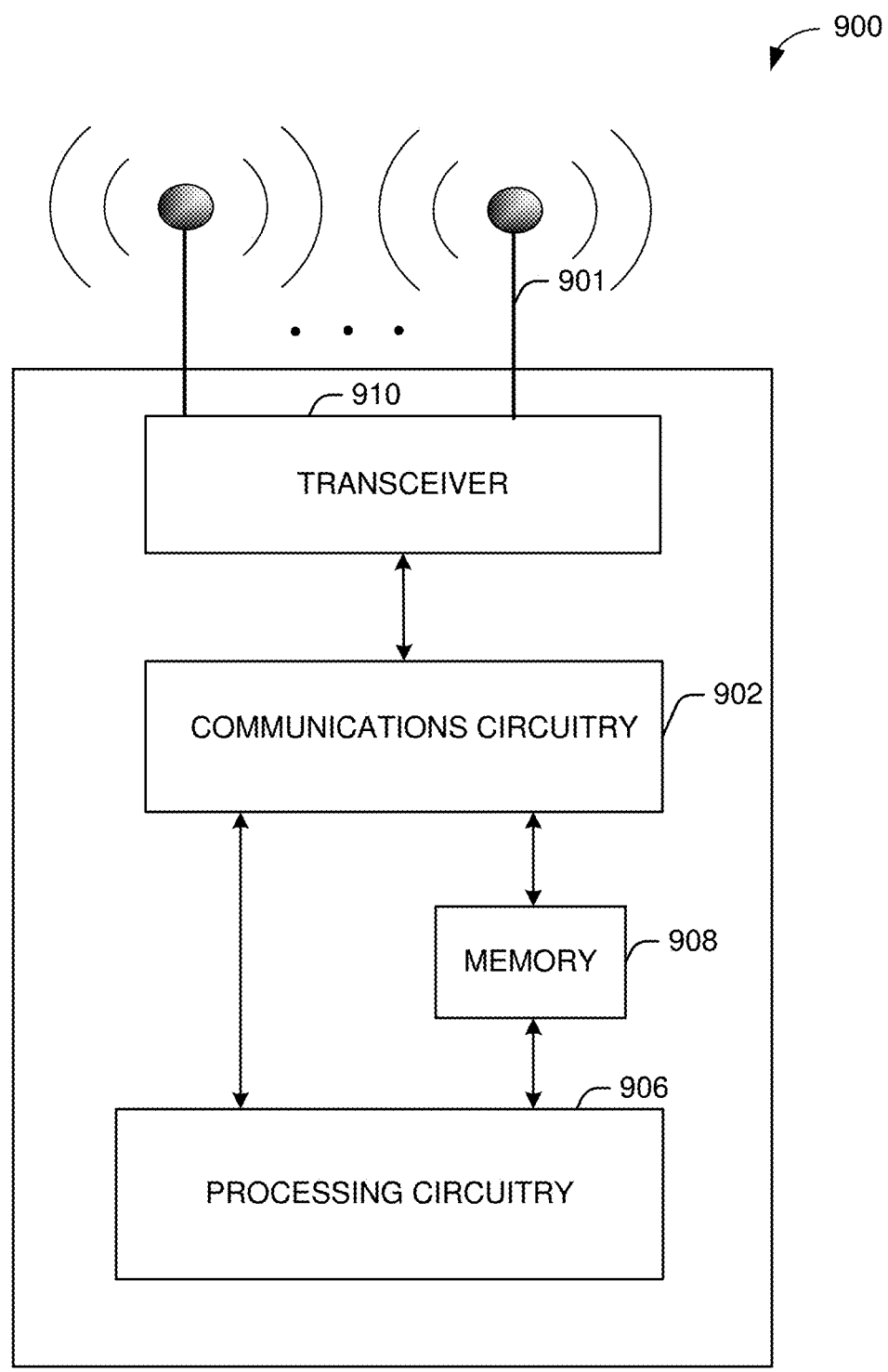
FIG. 9 illustrates a functional diagram of an exemplary communication station that may be suitable for use as a user device, in accordance with one or more example embodiments of the present disclosure.
Figure 10:
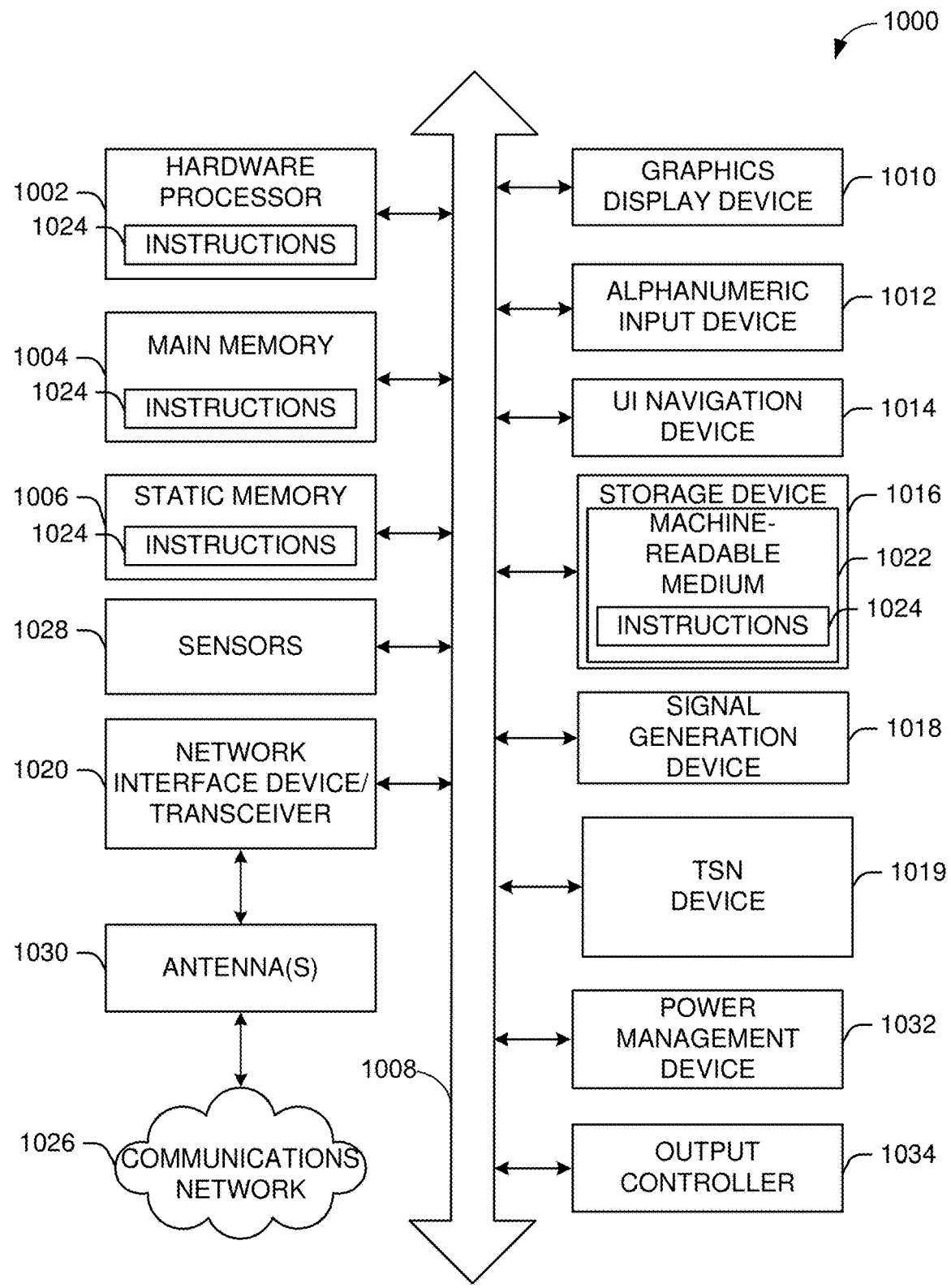
FIG. 10 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 9 and/or the example machine/system of FIG. 10.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

In one or more embodiments, a controller 108 (e.g., a wireless TSN controller) may facilitate enhanced coordination among multiple APs (e.g., AP 104 and AP 106). The controller 108 may be a central entity or another AP, and may be responsible for configuring and scheduling time sensitive control and data operations across the APs. A wireless TSN (WTSN) management protocol may be used to facilitate enhanced coordination between the APs, which may be referred to as WTSN management clients in such context. The controller 108 may enable device admission control (e.g., control over admitting devices to a WTSN), joint scheduling, network measurements, and other operations. APs may be configured to follow the WTSN protocol.

In one or more embodiments, the use of controller 108 may facilitate AP synchronization and alignment for control and data transmissions to ensure latency with high reliability for time sensitive applications on a shared time sensitive data channel, while enabling coexistence with non-time sensitive traffic in the same network.

In one or more embodiments, the controller 108 and its coordination may be adopted in future Wi-Fi standards for new bands (e.g., 6-7 GHz), in which additional requirements of time synchronization and scheduled operations may be used. Such application of the controller 1 108 may be used in managed Wi-Fi deployments (e.g., enterprise, industrial, managed home networks, etc.) in which time sensitive traffic may be steered to a dedicated channel in existing bands as well as new bands.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad, 802.11ay). 800 MHz channels (e.g. 802.11ah). The communications antennas may operate at 28

GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1A, the AP 102 and the user devices 120 may exchange frames. For example, the AP 102 and the user devices 120 may send Ethernet frames 140 (e.g., 802.3 frames) and Wi-Fi frames 142 (e.g., 802.11 frames) to one another. The AP 102 may send beacons 144 (e.g., as defined by the IEEE 802.11 standards) to the user devices 120, and the AP 102 and the user devices 120 may exchange low latency service (LLS) frames 146 as described further herein. For example, the Ethernet frames 140 may use the format shown in FIG. 2B. The Wi-Fi frames 142 may use the format shown in FIG. 3B. The beacons 144 may include multiple fields as defined by the IEEE 802.11 technical standards, including a quality of service (QoS) information field according to Table 1 below.

TABLE 1

Beacon Quality of Service Information Field:

| Field | | | | |
|---|---|---|---|---|
| EDCA Parameter Set Update Count | Q-Ack | Queue Request | TXOP Request | Reserved |
| Bits Bit 0-Bit 3 | Bit 4 | Bit 5 | Bit 6 | Bit 7 |

In this manner, the AP 102 may advertise to the user devices 120 that the AP 102 supports a LLS by using the reserved bit of the QoS field of the beacons 144.

In one or more embodiments, the LLS frames 146 may include LLS requests (e.g., sent by the user devices 120) to request that the AP 102 confirm the ability to provide certain parameters indicated in the requests, such as TSN capabilities, a maximum MAC service data unit (MSDU) size, a burst size (e.g., a maximum aggregate size of MSDUs that arrive during a service interval), a service profile (e.g., whether periodic or non-periodic event-driven, random, etc.), transmission direction (e.g., uplink, downlink, or both/symmetric stream), a minimum service interval (e.g., a requested periodicity of service or minimum MSDU inter-arrival time if the service profile is periodic; when the service profile is non-periodic, the parameter may define a minimum interval time between events), a latency bound (e.g., a maximum time required for successful delivery of an MSDU or aggregated MSDU—a latency budget for the delivery of the MSDU or aggregated MSDU), a packet data rate reliability (e.g., expected packet delivery ratio within the latency bound—used to represent the tolerance of the traffic stream to packet that miss the deadline, which may be calculated as −1 packet data rate), jitter (e.g., the expected variation in latency), and a latency tolerance/deadline delivery (e.g., no tolerance). LLS users may refer to upper layer (e.g., of a device's communication layer stack) processes and applications (e.g., at the operating system level) that may request and use a service. To request a service, the upper layer traffic stream of the device may conform to the parameters provided during a service negotiation between the AP 102 and the user devices 120.

In one or more embodiments, the LLS frames 146 may include LLS responses to LLS requests, the responses including a status (e.g., accept proposed parameters, reject proposed parameters, modified proposed parameters with a modified set of parameters different than the requested parameters) and/or updated parameters (e.g., maximum MSDU, burst, service profile, minimum service interval, latency bound, packet data rate, jitter, etc.). The LLS requests and responses may represent device interface primitives that may be defined as part of the 802.11 MAC sublayer management entity (MLME) of the AP 102 and the user devices 120. The AP 102 and the user devices 120 may be providers of a service, and the AP 102 may decide whether an LLC request is accepted. The AP 102 and the user devices 120 may be assumed to have a TS traffic stream (e.g., a higher layer traffic stream with TS requirements), a worst case latency (e.g., required for delivery a data frame between the devices—the data is not useful if delivered later than the worst case latency), and a packet data rate (e.g., a percentage of data frames in a TS stream that are delivered under a worst case latency). LLS may refer to a service provided to a higher layer traffic stream that prioritizes and delivers MSDUs within a worst case latency budget with a given packet data rate (e.g., 99.9%).

It is understood that the above descriptions are for purposes of illustration and are not meant to be limiting.

Figure 1B:
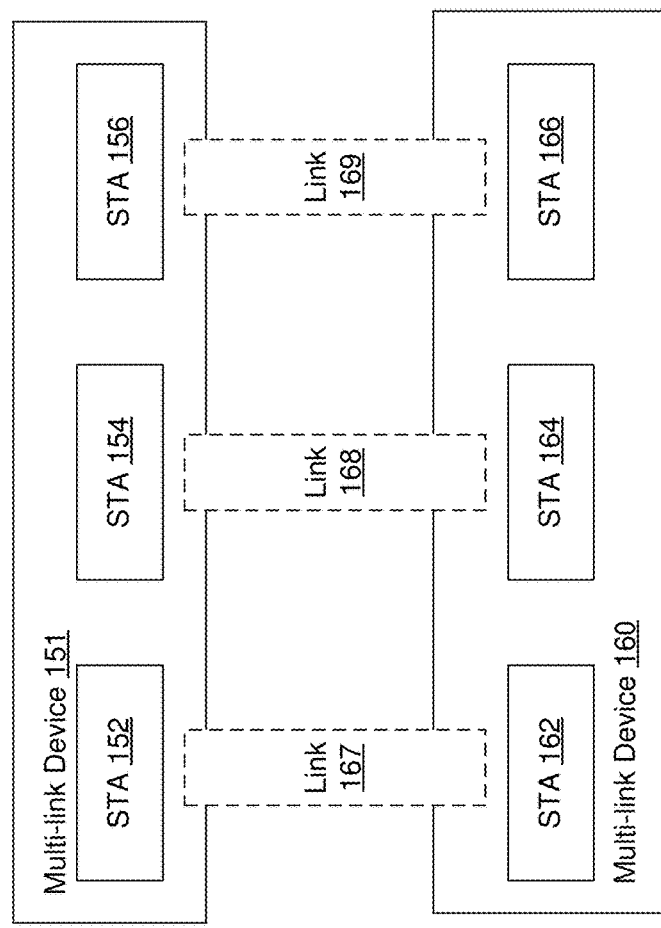
FIG. 1B depicts an illustrative schematic diagram for multi-link device (MLD) communications between two logical entities, in accordance with one or more example embodiments of the present disclosure.

FIG. 1B depicts an illustrative schematic diagram 150 for MLD communications between two logical entities, in accordance with one or more example embodiments of the present disclosure.

Referring to FIG. 1B, there are shown two MLDs in communication with each other. MLD 151 may include multiple STAs (e.g., STA 152, STA 154, STA 156, etc.), and MLD 160 may include multiple STAs (e.g., STA 162, STA 164, STA 166, etc.). The STAs of the MLD 151 and the STAs of the MLD 160 may set up links with each other (e.g., link 167 for a first frequency band used by the STA 152 and the STA 162, link 168 for a second frequency band used by the STA 154 and the STA 164, link 169 for a second frequency band used by the STA 156 and the STA 166). In this example of FIG. 1B, the two MLDs may be two separate physical devices, where each one comprises a number of virtual or logical devices (e.g., the STAs).

Figure 1C:
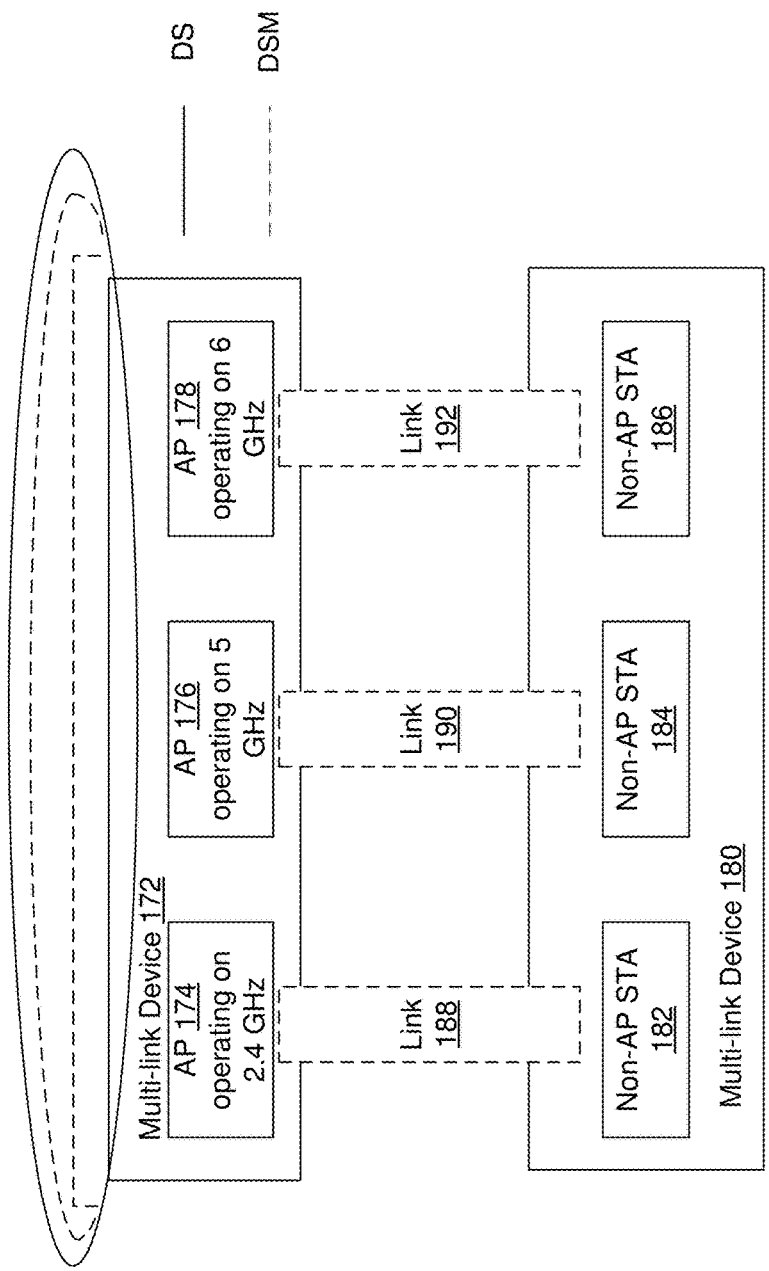
FIG. 1C depicts an illustrative schematic diagram for MLD communications between an access point (AP) MLD with logical entities and a non-AP MLD with logical entities, in accordance with one or more example embodiments of the present disclosure.

FIG. 1C depicts an illustrative schematic diagram 170 for MLD communications between an AP MLD with logical entities and a non-AP MLD with logical entities, in accordance with one or more example embodiments of the present disclosure.

Referring to FIG. 1C, there are shown two MLDs on either side, each which includes multiple STAs that can set up links with each other. For infrastructure framework, MLD 172 may be an A-MLD with logical APs (e.g., AP 174, AP 176, and AP 178) on one side, and MLD 180 may be a non-AP MLD including non-AP logical entities (non-AP STA 182, non-AP STA 184, and non-AP STA 186) on the other side. The detailed definition is shown below. It should be noted that the term MLLE and MLD are interchangeable and indicate the same type of entity. Throughout this disclosure, MLLE may be used but anywhere the MLLE term is used, it can be replaced with MLD. Multi-link non-AP logical entity (non-AP MLLE, also can be referred to as non-AP MLD): A multi-link logical entity, where each STA within the multi-link logical entity is a non-AP EHT STA. It should be noted that this framework is a natural extension from the one link operation between two STAs, which are AP and non-AP STA under the infrastructure framework (e.g., when an AP is used as a medium for communication between STAs).

In the example of FIG. 1C, the MLD 172 and the MLD 180 may be two separate physical devices, where each one comprises a number of virtual or logical devices. For example, the multi-link AP logical entity may comprise three APs, AP 174 operating on 2.4 GHz (e.g., link 188), AP 176 operating on 5 GHz (e.g., link 190), and AP 178 operating on 6 GHz (e.g., link 192). Further, the multi-link non-AP logical entity may comprise three non-AP STAs, non-AP STA 182 communicating with AP 174 on link 188, non-AP STA 184 communicating with AP 176 on link 190, and non-AP STA 186 communicating with AP 178 on link 192.

The MLD 172 is shown in FIG. 1C to have access to a distribution system (DS), which is a system used to interconnect a set of BSSs to create an extended service set (ESS). The MLD 172 is also shown in FIG. 1C to have access a distribution system medium (DSM), which is the medium used by a DS for BSS interconnections. Simply put, DS and DSM allow the AP to communicate with different BSSs.

It should be understood that although the example shows three logical entities within the MLD 172 and the three logical entities within the MLD 180, this is merely for illustration purposes and that other numbers of logical entities with each of the MLDs may be envisioned.

It is understood that the above descriptions are for purposes of illustration and are not meant to be limiting.

Figure 2A:
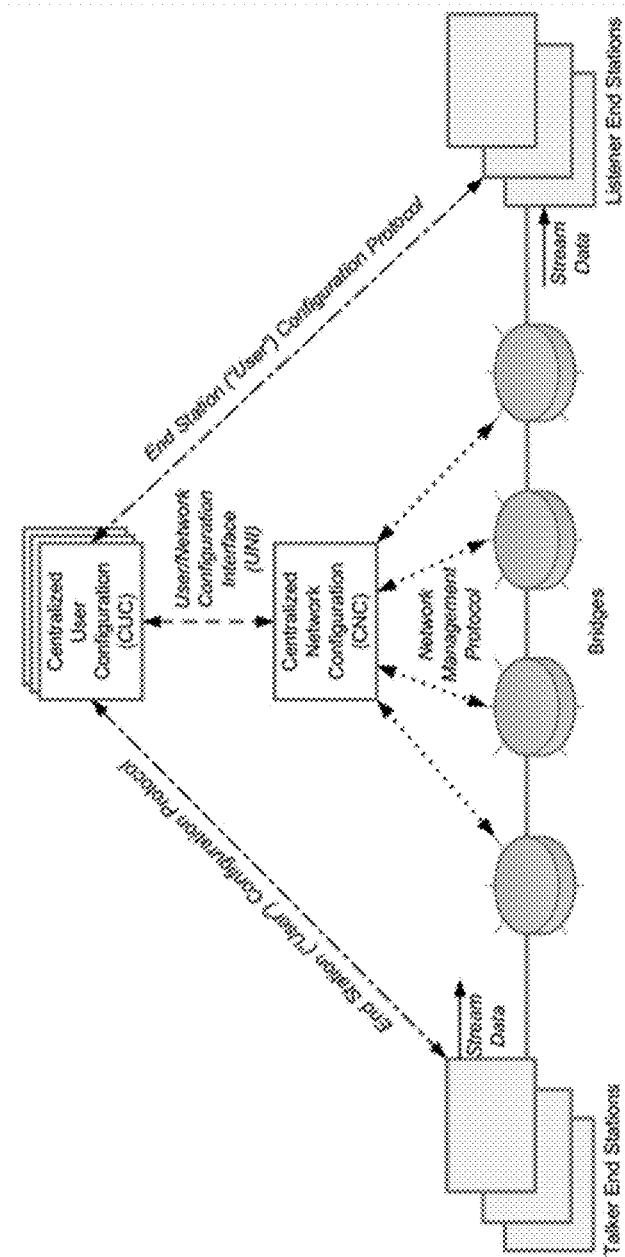
FIG. 2A depicts an illustrative time-sensitive networking (TSN) configuration model, in accordance with one or more example embodiments of the present disclosure.

FIG. 2A depicts an illustrative TSN configuration model 200, in accordance with one or more example embodiments of the present disclosure.

Referring to FIG. 2A, the TSN configuration model 200 shows a centralized user configuration (CUC) using a user/network configuration interface (UNI) to access a centralized network configuration (CNC), and a network management protocol being distributed to devices (e.g., talker end stations and listener end stations) using bridges. User configuration protocols may be distributed between the CUC and the devices. In this manner, the connections between the talker end stations and the listener end stations may be Ethernet wired connections (e.g., via the bridges).

TSN communications may require minimal packet loss, so redundant transmissions may be used to ensure that a listener device receives a packet from a talker device. For example, a gaming application may require TSN so that a listener device does not miss any packets sent by a talker device. By sending redundant transmissions, a talker device may ensure that a listener device receives at least one of the redundant transmissions.

Figure 2B:
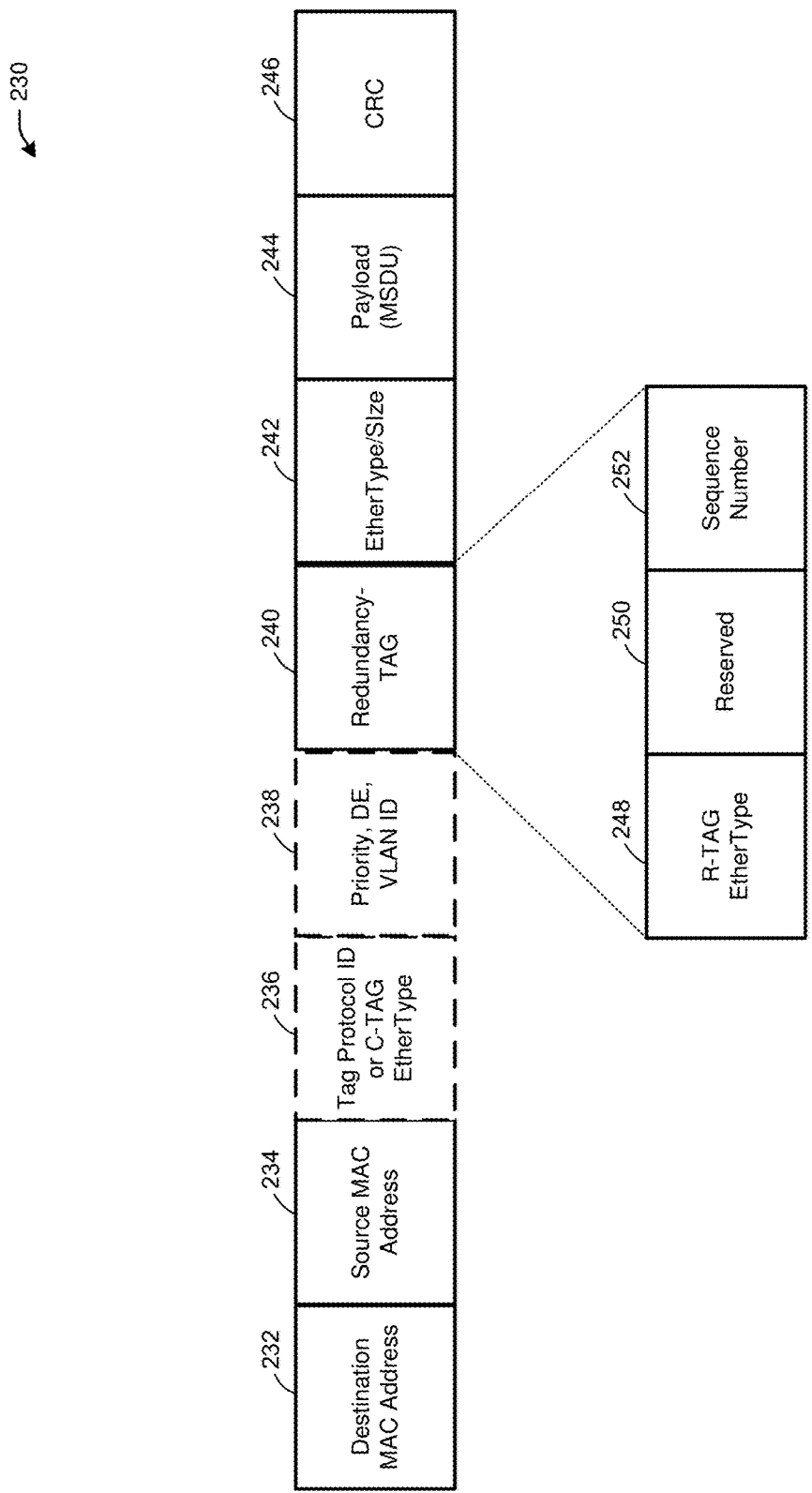
FIG. 2B depicts an example layer-2 Ethernet frame structure, in accordance with one or more example embodiments of the present disclosure.

To enable redundancy for TSN application in Ethernet based networks, the 802.1cb, 802.1Qcc and 802.1Qca standards need to operate jointly. 802.1Qcc defines a fully centralized configuration model that allows all-knowing, centralized software controller to receive stream requirements from talkers and listeners and to directly configure the relevant bridges to meet those requirements. FIG. 2A shows the 802.1Qcc fully centralized configuration mode. 802.1Qca defines the path control and reservation, which, working with the 802.1Qcc enables redundancy path selection and reservation from the talker to the listener based on the QoS requirements and also the network information reported from the end devices and the bridges. To indicate the selected path information for the frame forwarding, an 802.1Q tag with VLAN ID information may be inserted into an 802.3 Ethernet frame as shown in FIG. 2B. As a result, when the relay receives a new frame, the relay can rely on the VLAN ID information to identify on which port it should forward the received packet. 802.1cb specifies procedures, managed objects and protocols for bridges and end stations that provide, 1) Identification and replication of frames, for redundant transmission; 2) Identification and elimination of duplicate frames, for redundant reception. To identify duplicated frame, a redundancy tag with sequence number information is added in a MAC header of 802.3 Ethernet frame as shown in FIG. 2B. As a result, when the end device or the relay receives a new frame, the end device or relay can rely on the destination MAC address and the sequence number information indicated in the redundancy tag to determine whether it is a frame that the device has received before. If it is a duplicated frame, the duplicate may be discarded, and no further process will be initiated.

FIG. 2B depicts an example layer-2 Ethernet frame structure 230, in accordance with one or more example embodiments of the present disclosure.

Referring to FIG. 2B, the layer-2 Ethernet frame structure 230 (e.g., for an 802.3 Ethernet frame) may include multiple fields, such as a destination MAC address 232 (e.g., the MAC address of the recipient/listener device), a source MAC address 234 (e.g., the MAC address of the sender/talker device), an optional tag protocol ID or C-Tag EtherType (e.g., Ethernet type protocol) field 236, an optional priority/VLAN ID field 238, a redundancy tag field 240 (e.g., R-Tag), an EtherType/Size field 242, a payload 244 (e.g., MSDU payload), and a cyclic redundancy check (CRC) 246. The redundancy tag field 240 may include an R-Tag EtherType subfield 248 (e.g., to indicate an Ethernet type protocol used with a redundancy tag), a reserved field 250 (e.g., with reserved bits for further use), and a sequence number 252 to identify whether the frame is a duplicate (e.g., two frames having the same sequence number may be duplicates).

As explained with respect to FIG. 2A, to indicate the selected path information for the frame forwarding, an 802.1Q tag (e.g., the redundancy tag field 240) with VLAN ID information may be inserted into an 802.3 Ethernet frame as shown in FIG. 2B. As a result, when a relay device receives a new frame, the relay can rely on the VLAN ID information to identify on which port it should forward the received packet. 802.1cb specifies procedures, managed objects and protocols for bridges and end stations that provide, 1) Identification and replication of frames, for redundant transmission; 2) Identification and elimination of duplicate frames, for redundant reception. To identify duplicated frame, a redundancy tag with sequence number information is included in a MAC header of 802.3 Ethernet frame as shown in FIG. 2B. As a result, when the end device or the relay receives a new frame, the end device or relay can rely on the destination MAC address and the sequence number information indicated in the redundancy tag field 240 to determine whether it is a frame that the device has received before. If it is a duplicated frame, the duplicate may be discarded, and no further process will be initiated.

Figure 2C:
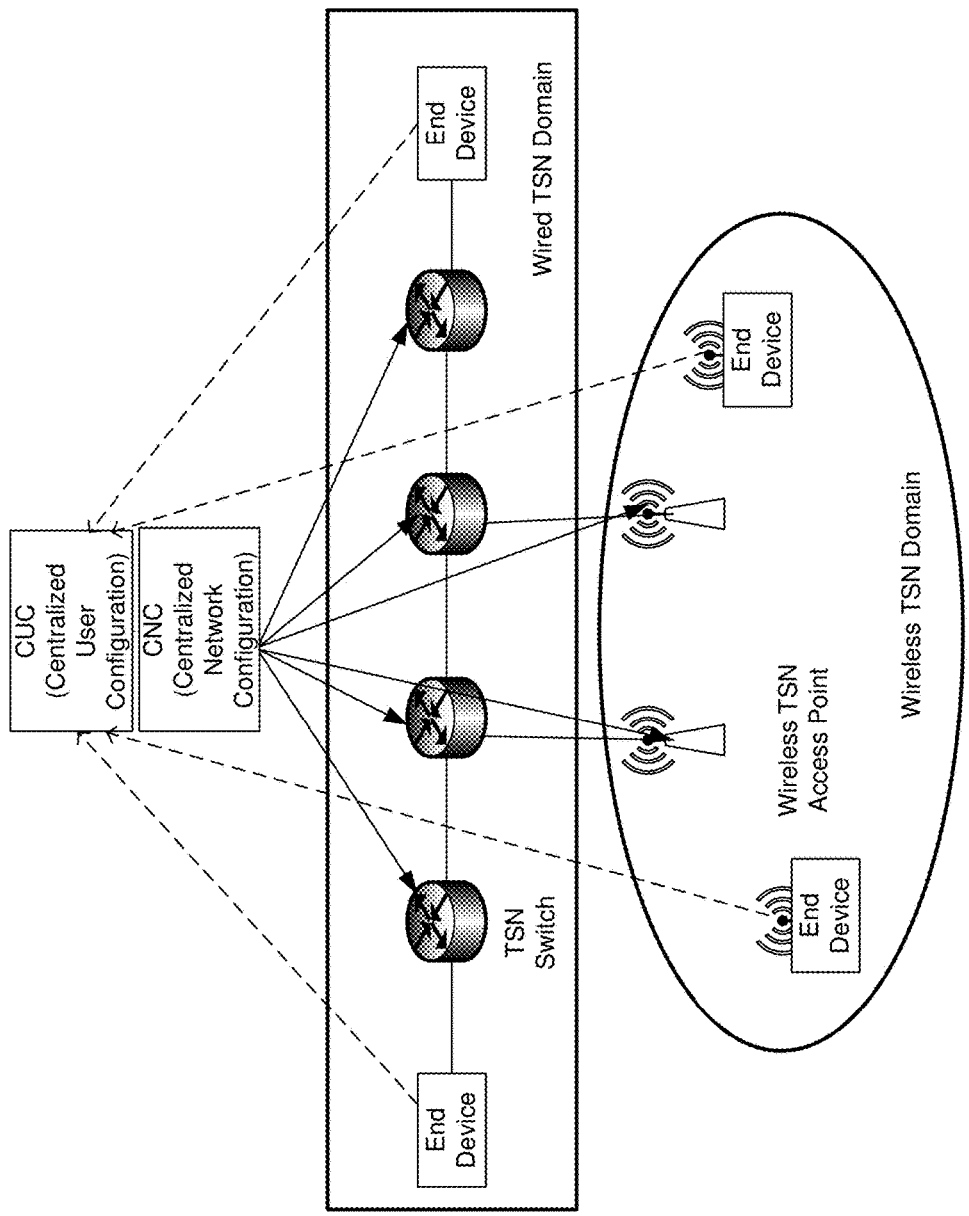
FIG. 2C depicts an illustrative TSN configuration model with both a wired domain and a wireless domain, in accordance with one or more example embodiments of the present disclosure.

FIG. 2C depicts an illustrative TSN configuration model 260 with both a wired domain and a wireless domain, in accordance with one or more example embodiments of the present disclosure.

Referring to FIG. 2C, the TSN configuration model 260 may expand the wired network (e.g., FIG. 2A) to include both a wired TSN domain and a wireless TSN domain. To allow for redundancy in wireless (e.g., 802.11) transmissions, 802.11 frames may need to include some information used to identify redundant transmissions, including transmissions that originally may have been either 802.3 or 802.11 frames.

Figure 3A:
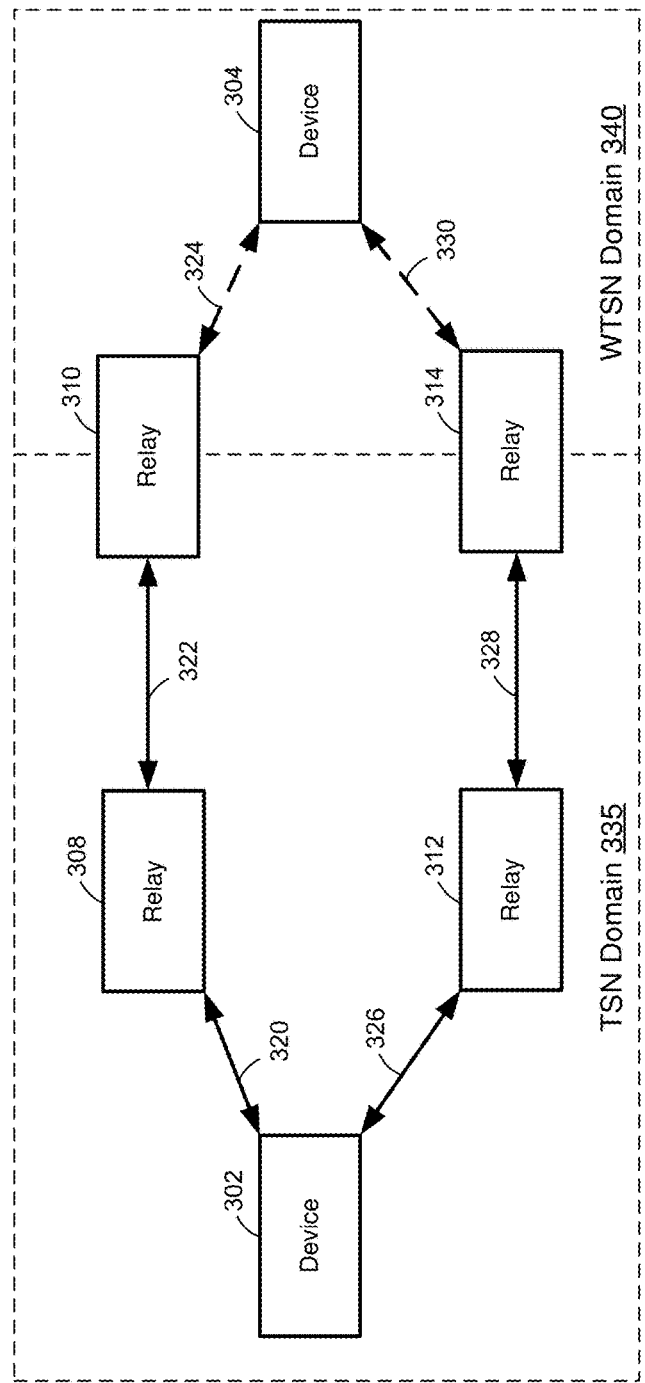
FIG. 3A depicts a schematic communication system between devices using frame replication and elimination, in accordance with one or more example embodiments of the present disclosure.

FIG. 3A depicts a schematic communication system 300 between devices using frame replication and elimination, in accordance with one or more example embodiments of the present disclosure.

Referring to FIG. 3A, the communication system 300 may include a device 302 communicating with a device 304. The device that sends frames (e.g., the Ethernet frames 140 and/or the Wi-Fi frames 142 of FIG. 1A) may be referred to as the talker, and the device that receives the frames sent by the talker may be referred to as the listener. For example, when the device 302 transmits to the device 304, the device 302 is the talker, and the device 304 is the receiver. In between the device 302 and the device 304 may be relay devices (e.g., relay 308, relay 310, relay 312, relay 314) connected wirelessly or wired to one another and/or to the devices 302 and 304. For example, one communication path between the device 302 and the device 304 may include wired connection 320, wired connection 322, and wireless connection 324. Another communication path between the device 302 and the device 304 may include wired connection 326, wired connection 328, and wireless connection 330. An Ethernet TSN domain 335 may include the wired connections, and a wireless TSN domain 340 (e.g., a Wi-Fi TSN domain) may include the wireless connections.

In one or more embodiments, when one of the end devices (e.g., device 302) sends data to another end device (e.g., device 304) over two redundancy paths (e.g., the first path using the wired connection 320, the wired connection 322, and the wireless connection 324, and the second path using the wired connection 326, the wired connection 328, and the wireless connection 330), and the last hop (e.g., using the wireless connection 324) is sent over Wi-Fi, the way for the relay 310 to forward a received Ethernet frame (e.g., of the Ethernet frames 140 of FIG. 1A using the frame format of FIG. 2B, received using the wired connection 322) may include adding the redundancy tag information (e.g., the redundancy tag field 240 of FIG. 2B) over Wi-Fi (e.g., using an 802.11 frame, such as the Wi-Fi frames 142 of FIG. 1A, over the wireless connection 324) to the listener for redundancy (e.g., when the same packet is sent using the second path) and packet elimination. In particular, in an 802.11 data frame, there is a Sequence Control field for the sequence number information as shown below in Table 2.

TABLE 2

802.11 Data Frame.

| Field | Octets |
|---|---|
| Frame Control | 2 |
| Duration | 2 |
| Address 1 | 6 |
| Address 2 | 6 |
| Address 3 | 6 |
| Sequence Control | 2 |
| Address 4 | 0 or 6 |
| QoS Control | 0 or 2 |
| HT Control | 0 or 4 |
| Frame Body | Variable length |
| FCS | 4 |

However, the Sequence Control field in Table 2 is used for point-to-point (e.g., link layer) transmissions. A sequence number field (e.g., the sequence number 252 of FIG. 2B) for end-to-end frame replication and elimination may be required when using a Wi-Fi link (e.g., the wireless connection 324) to integrate the Wi-Fi/802.11 links as part of a broader TSN infrastructure that supports path redundancy based on the 802.1CB standard.

Figure 3B:
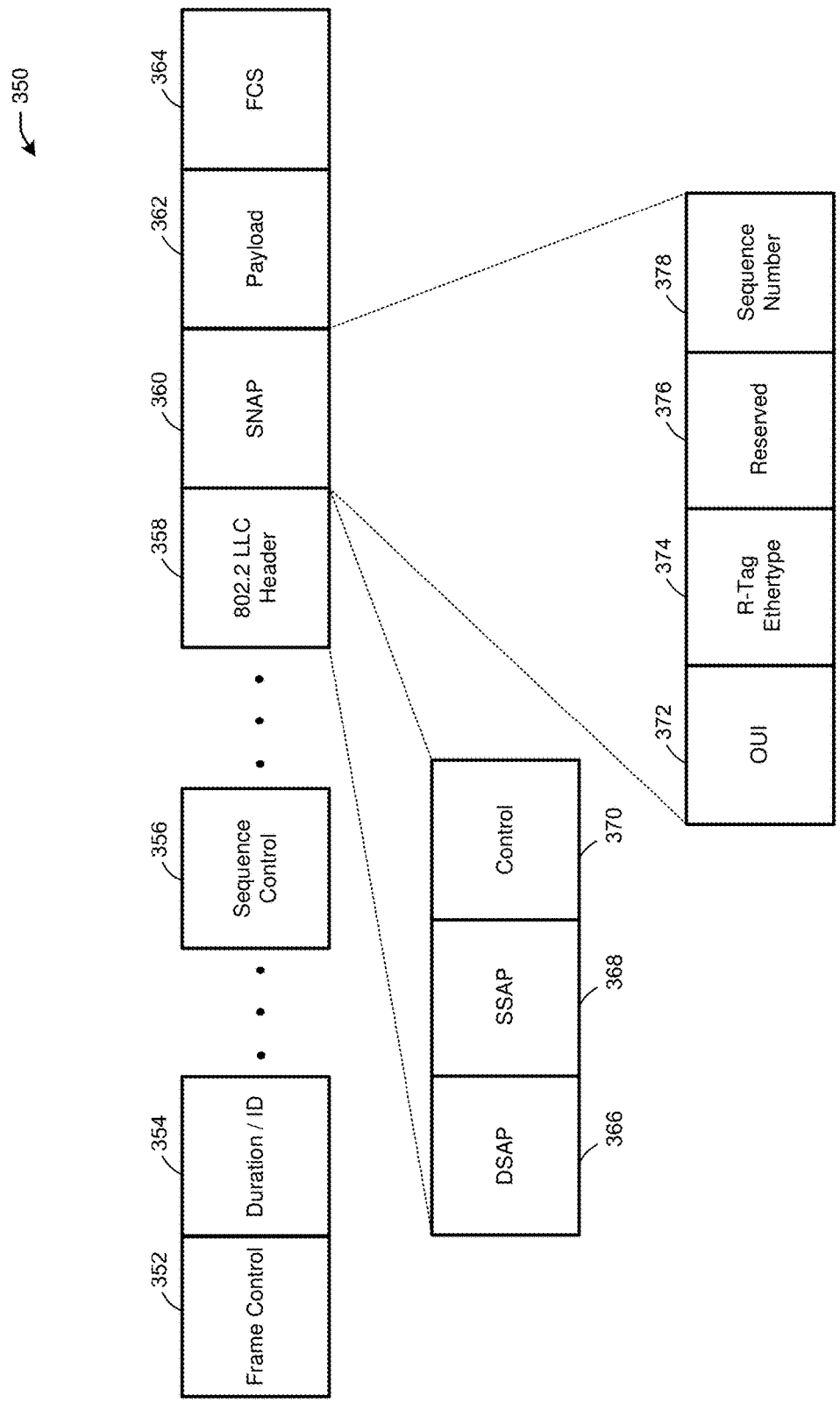
FIG. 3B depicts an 802.11 frame structure for using frame redundancy, in accordance with one or more example embodiments of the present disclosure.

In one or more embodiments, as shown in FIG. 3B, redundancy tag information may be added to the SNAP field of a Wi-Fi frame (e.g., the Wi-Fi frames 140 of FIG. 1A), and the protocol stack for the talker, listener, and relay systems also may be provided. A new 802.1CB function for the 802.11 devices to process the 802.1Q tag and perform the required 802.1CB behavior may be provided accordingly.

FIG. 3B depicts an 802.11 frame structure 350 for using frame redundancy, in accordance with one or more example embodiments of the present disclosure.

Referring to FIG. 3B, to allow for redundancy when using 802.11 frames, the data frame format shown in Table 2 may be modified as shown in FIG. 3B. The 802.11 frame structure 350 may include multiple fields, such as those shown in Table 2, including a frame control field 352, a duration/ID field 354, a sequence control field 356, an 802.2 LLC header field (added to the 802.11 frame defined in Table 2), a SNAP field 360 (added to the 802.11 frame defined in Table 2), a payload 362, and a frame check sequence (FCS) 364. As mentioned above, the Sequence Control field 356 is used for point-to-point (e.g., link layer) transmissions. As shown in FIG. 2B, 802.3 Ethernet frames use the sequence number 252 for end-to-end frame replication. To include the sequence number of an 802.3 Ethernet frame in a corresponding 802.11 frame (e.g., when the relay 310 receives an 802.3 Ethernet frame with the sequence number 252 of FIG. 2B and needs to forward the data of the 802.3 Ethernet frame over the wireless connection 324 in an 802.11 frame), the sequence number 252 may be added in a corresponding portion of the SNAP field 360 as described below.

Still referring to FIG. 3B, specifically the 802.2 LLC Header 358 and the SNAP field 360 added to the 802.11 frame format shown in Table 2, the 802.2 LLC Header 358 may include a destination serve access point (DSAP) subfield 366, a source service access point (SSAP) subfield 368, and a Control subfield 370. The SNAP field 360 may include an organizationally unique identifier (OUI) 372, an R-Tag Ethertype subfield 374, reserved bits 376, and a sequence number 378 (e.g., which may match the sequence number 252 of FIG. 2B to indicate that an 802.3 frame with the sequence number 252 corresponds to the 802.11 frame with the sequence number 378). When a device receives multiple frames having the same sequence number 252 and/or sequence number 378, the device may determine that the frames are duplicates of one another (e.g., part of a redundancy scheme for TSN operations). The device may process or forward the first frame with the sequence number, and may discard subsequently received frames with the same sequence number.

The DSAP subfield 366 and the SSAP subfield 368 may include hexadecimal values of AA or AB, indicating that the SNAP field 360 follows the 802.2 LLC Header 358. The OUI 372 may include a hexadecimal value of 000000. The R-tag Ethertype subfield 374 may indicate the protocol used (e.g., an Ethernet protocol for an Ethernet frame). In this manner, an 802.11 frame may include an indication of an 802.3 frame/protocol.

Figure 4A:
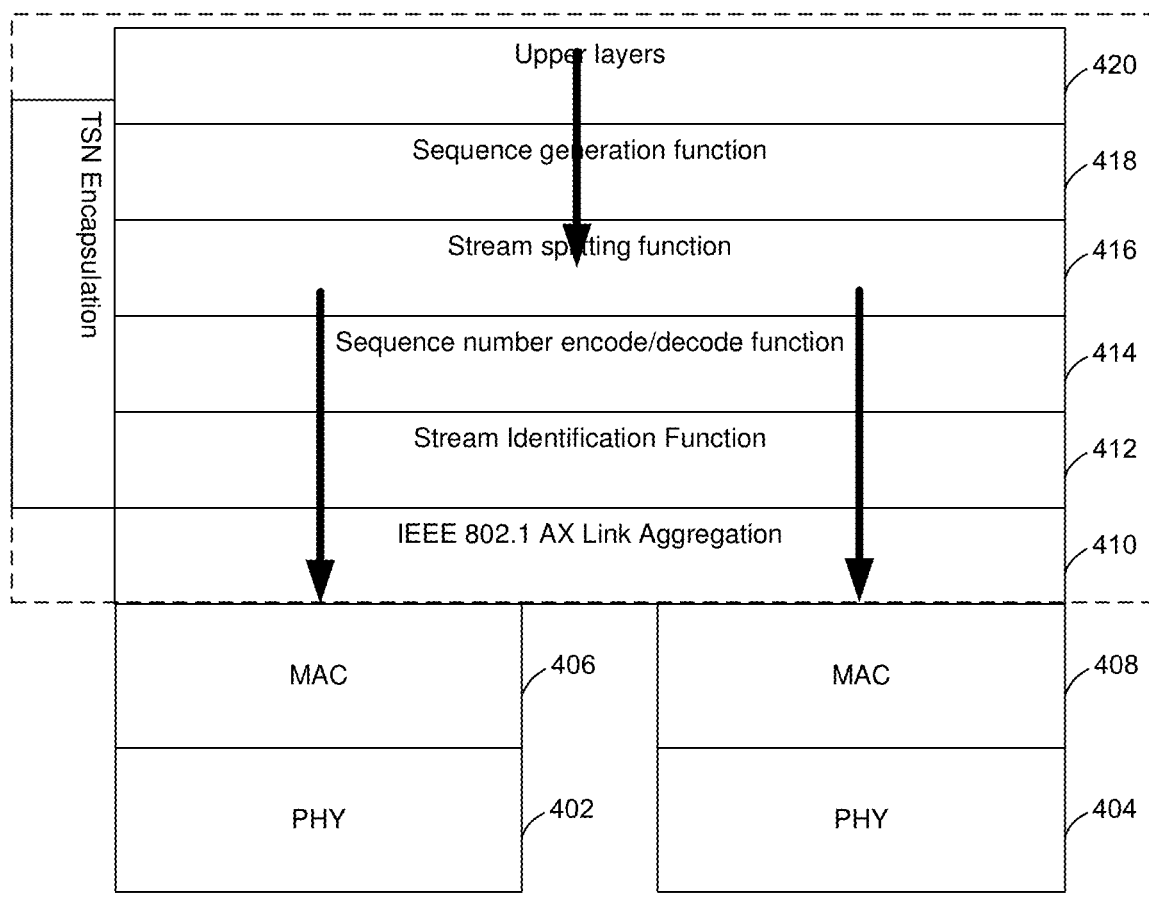
FIG. 4A depicts an example schematic of a protocol stack of a device of FIG. 3A, in accordance with one or more example embodiments of the present disclosure.

FIG. 4A depicts an example schematic of a protocol stack 400 of a device of FIG. 3A, in accordance with one or more example embodiments of the present disclosure.

Figure 4B:
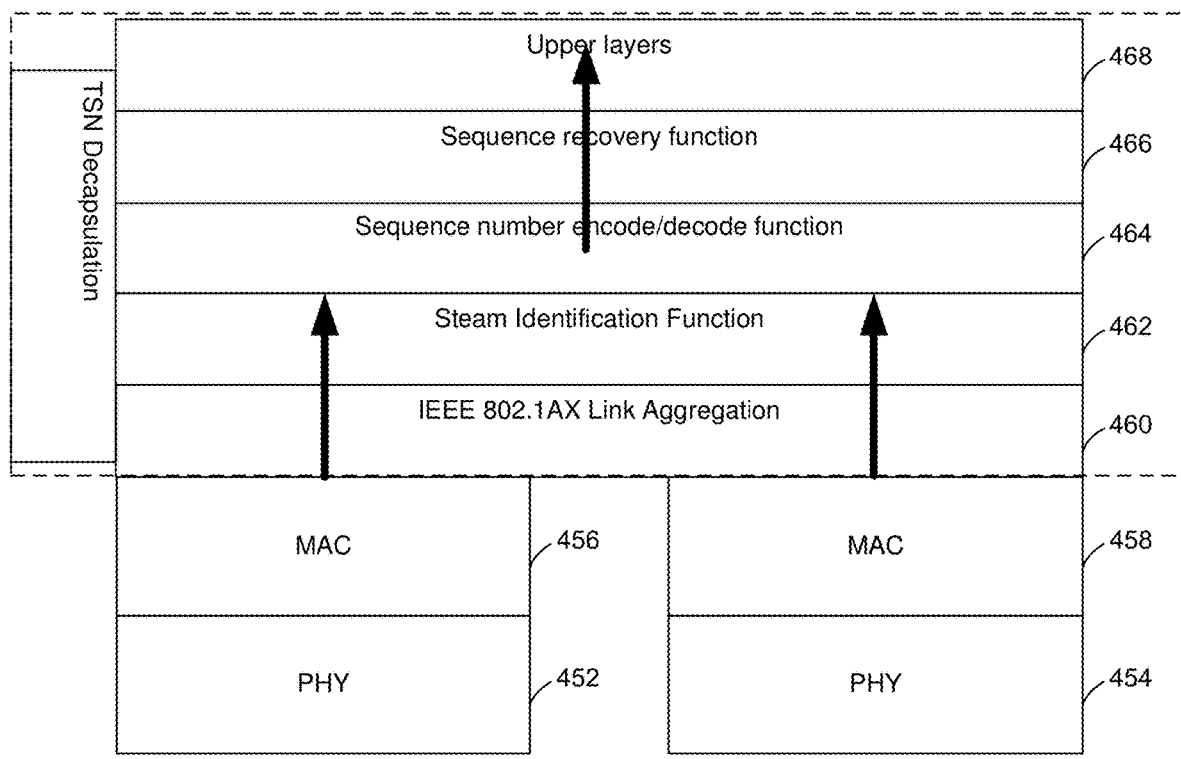
FIG. 4B depicts an example schematic of a protocol stack of a device of FIG. 3A, in accordance with one or more example embodiments of the present disclosure.

FIG. 4B depicts an example schematic of a protocol stack 450 of a device of FIG. 3A, in accordance with one or more example embodiments of the present disclosure.

Referring to FIG. 4A and FIG. 4B, the protocol stacks 400 and 450 may allow for devices (e.g., the devices 302 and 304, the relays 308-314 of FIG. 3A) to use the redundancy process for TSN operations. As shown, the protocol stacks 400 and 450 may include separate physical layers (PHY) 402-404 and 452-454, and MAC layers 406-408 and 456-458, an IEEE 802.1AX link aggregation 410 and 460, a stream identification function 412 and 462, a sequence number encode/decode function 414 and 464 (e.g., to encode or decode the sequence number 252 of FIG. 2B or the sequence number 378 of FIG. 3B), a stream splitting function 416 in the protocol stack 400, a sequence generation function 418 in the protocol stack 400 (e.g., for the sequence number 252 of FIG. 2B or the sequence number 378 of FIG. 3B), a sequence recovery function 466 in the protocol stack 450, and upper layers 420 and 468 of the protocol stacks 400 and 450.

Referring to FIG. 4A, the protocol stack 400 performs encapsulation and frame duplication for TSN redundancy operations. A Wi-Fi device may have two Wi-Fi interfaces. When it receives a frame from the upper layers, the device may perform TSN encapsulation. Each frame in a compound stream may be assigned a sequence number sub-parameter value by the sequence generation function when the frame is passed down to the lower layers. In the stream splitting function, each frame may be replicated and given two stream handle sub-parameter values. The two different stream handles result in the two frames being assigned two different VLAN IDs. The sequence number encode/decode function is responsible for inserting the sequence number sub parameter into the frame (encoding) and extracting the sequence number from the frame (decoding). The sequence number encode/decode function may encode the sequence number sub-parameter to the Sequence Number field of the redundancy tag information, fill the reserved field with zeros, and insert an EtherType and Redundancy tag information as the first octets of the MSDU parameter after the LLC header, thus increasing the size of the MSDU parameters by 6 octets. Based on the two different VLAN IDs, the two duplicated frames may be passed down to two different 802.11 MAC by the IEEE 802.1AX link aggregation. There may be a mapping table between the VLAN ID and the SS ID in each Wi-Fi device.

Referring to FIG. 4A, the protocol stack 400 performs decapsulation and frame duplication recognition for TSN redundancy operations. A Wi-Fi device operating as a listener may have two Wi-Fi interfaces. When the device receives a new Wi-Fi packet, the device may perform TSN decapsulation. The Stream Identification function is responsible for identifying whether it the frame a frame with a redundancy tag or not. Each of the first two octets of the LLC header may be examined for equality with hexadecimal values AA or AB, and the OU may be examined for equality with the value 000000. When those values are used, the first two octets of the MSDU following the 802.2 LLC header 358 of FIG. 3B may be examined for equality with the redundancy tag. When the redundancy tag uses the R-tag EtherType 374, the sequence number 378 encode/decode function may be initiated. The sequence number encode/decode function is responsible for inserting the sequence number sub-parameter into the frame and extracting the sequence number sub-parameter from the frame. After identifying a frame with redundancy tag, the first six octets of the MSDU may be removed, and the size of the MAC payload may be shorted by six octets. The sequence number 252 field of the Redundancy tag 240 of the 802.3 frame may be copied to the sequence number 378 sub-parameter of the 802.11 frame, and the contents of the reserved field 250 may be ignored. The sequence number 378 sub-parameter extracted from the SNAP field 360 with the destination MAC address 232 of the 803.2 frame may be used by the sequence recovery function for frame elimination. If a frame is a duplicated frame, the frame may be discarded/eliminated by the sequence recovery function, otherwise, it may be forwarded to the upper layers (and eventually sent over a communication link if forwarding is to occur).

Figure 5A:
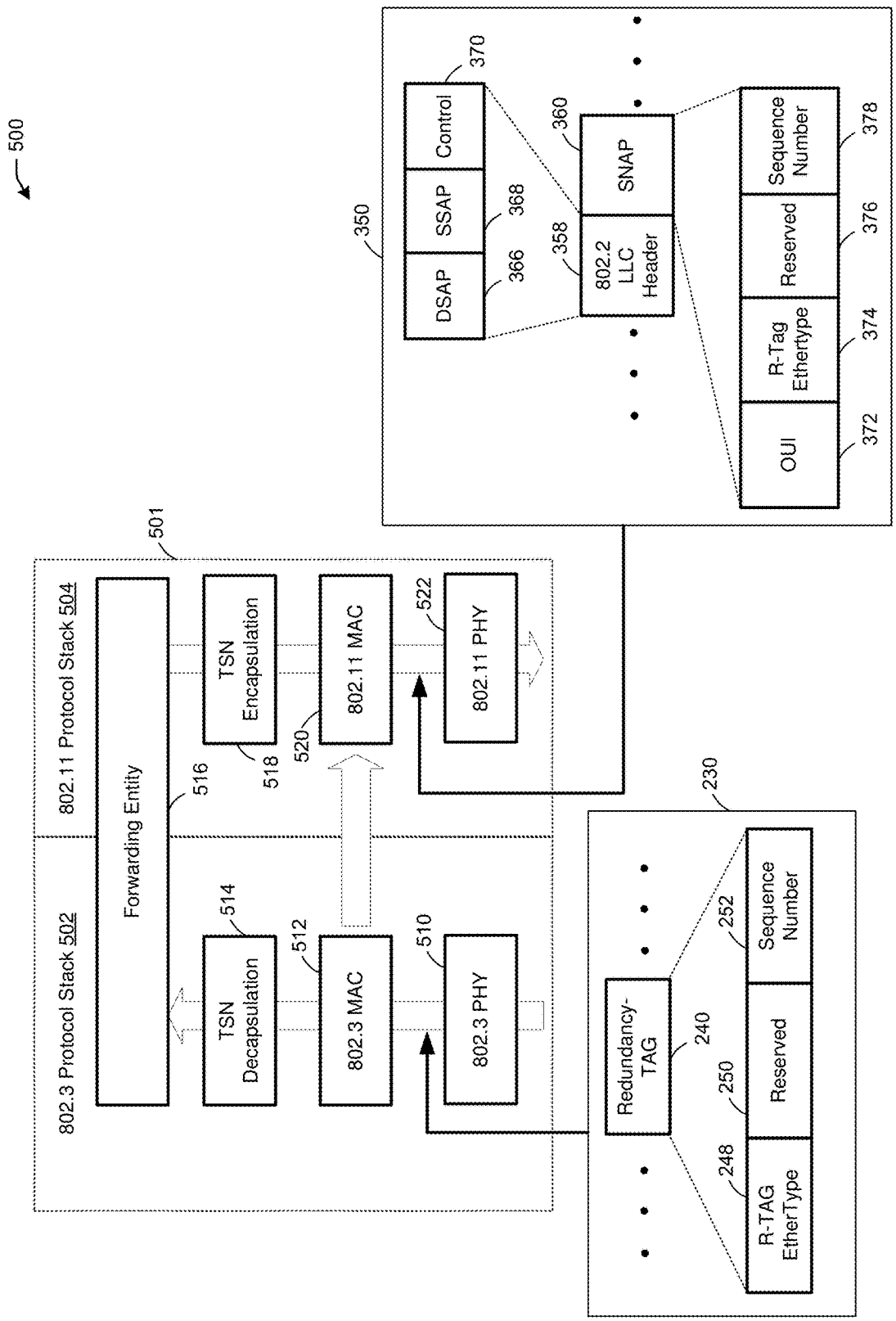
FIG. 5A illustrates an example process using a protocol stack of a device of FIG. 3A, in accordance with one or more example embodiments of the present disclosure.

FIG. 5A illustrates an example process 500 using a protocol stack of a device of FIG. 3A, in accordance with one or more example embodiments of the present disclosure.

Referring to FIG. 5A, the process 500 may include a device 501 (e.g., one of the devices 302 or 304, or relays 308-314 of FIG. 3A) with an 802.3 protocol stack 502 and an 802.11 protocol stack 504 (e.g., similar to the protocol stacks 400 and 450 of FIGS. 4A and 4B, respectively). The 802.3 protocol stack 502 identifies an 802.3 frame (e.g., the Ethernet frames 140 of FIG. 1A) with the layer-2 Ethernet frame structure 230 of FIG. 2B. The 802.3 protocol stack 502 may include an 802.3 PHY 510, an 802.3 MAC 512, a TSN decapsulation function 514, a forwarding entity 516 (e.g., between the 802.3 protocol stack 502 and the 802.11 protocol stack 504), a TSN encapsulation function 518, an 802.11 MAC 520, and an 802.11 PHY 522. In FIG. 5A, the device 501 with the 802.3 protocol stack 502 and the 802.11 protocol stack 504 may receive the 802.3 frame (e.g., using the wired connection 322 of FIG. 3A) and may decode the frame to determine whether the frame is a duplicate and/or is to be forwarded (e.g., using the wireless connection 324 of FIG. 3A). When the device 501 receives the Ethernet frame, the device 501 may follow IEEE 802.1cb to perform TSN decapsulation, including stream identification, sequence decoding, and sequence recovery (e.g., as described with respect to FIG. 4B). The size of the MSDU of the Ethernet frame may be shortened by ten octets after the TSN decapsulation. When the device 501 recognizes that the Ethernet frame is a duplicate (e.g., because the sequence number 252 matches a sequence number of another frame that the device 501 has received), the device 501 may discard/eliminate the frame using the sequence recovery function. When the frame is not a duplicate, the device 501 may forward the frame to a next device (e.g., the device 304 of FIG. 3A) using a Wi-Fi connection (e.g., the wireless connection 324 of FIG. 3A) after TSN encapsulation is performed by the 802.11 protocol stack 504, the TSN encapsulation including the sequence number encode/decode function and the stream identification function. The sequence number encode/decode function is responsible for inserting the sequence number 378 sub parameter into the frame (e.g., to match the sequence number 252). The sequence number encode/decode function may encode the sequence number 378 of the redundancy tag 240 information and fill the reserved bits 376 with zeros. The sequence number encode/decode function may insert the R-Tag EtherType 374 information as the first octets of the MSDU parameter after the 802.2 LLC header 358, thus increasing the size of the MSDU parameters by six octets. Based on the VLAN ID, which is obtained from the MAC header of the Ethernet frame (e.g., the priority, DE, VLAN ID 238 of FIG. 2B), and a mapping table between the VLAN ID and the SS ID, the device 501 may forward the 802.11 data frame to the next hop device with the mapping SS ID. There may be a mapping table between the VLAN ID and the SS ID in each Wi-Fi device. This is similar to a mapping table between the VLAN ID and the Ethernet port number in each Ethernet device. If the device 501 has two Wi-Fi network interfaces, it can replicate the received Ethernet frame and send these two frames over two different network interfaces through the stream splitting function, sequence number encode/decode function, stream identification function, and IEEE 802.1AX link aggregation.

Figure 5B:
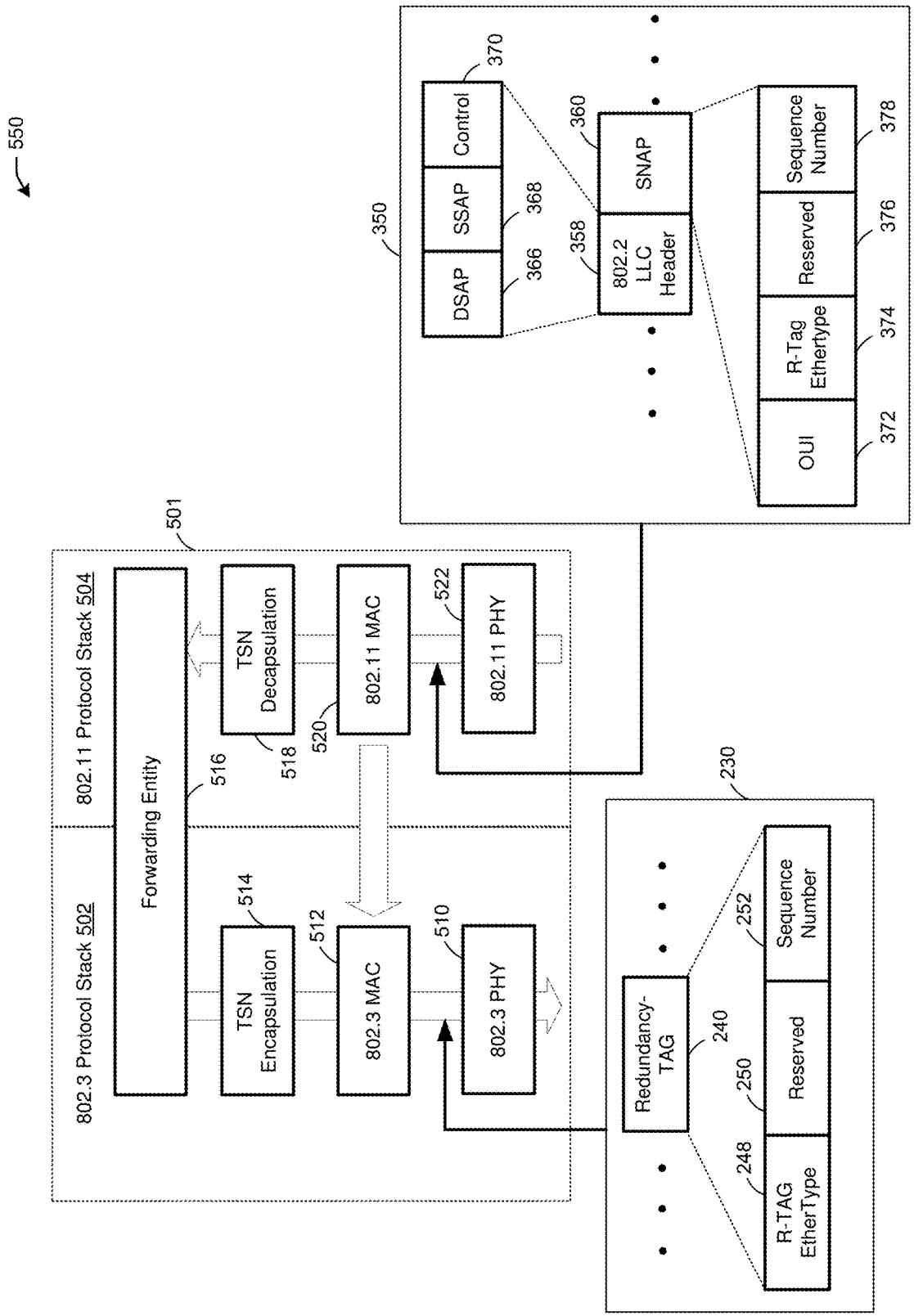
FIG. 5B illustrates an example process using a protocol stack of a device of FIG. 3A, in accordance with one or more example embodiments of the present disclosure.

FIG. 5B illustrates an example process 550 using a protocol stack of a device of FIG. 3A, in accordance with one or more example embodiments of the present disclosure.

Referring to FIG. 5B, the process 550 may include the device 501 of FIG. 5A with the 802.3 protocol stack 502 and the 802.11 protocol stack 504 of FIG. 5A. When the device 501 receives an 802.11 Wi-Fi packet (e.g., using the 802.11 frame structure 350 of FIG. 3B), the device 501 may perform TSN decapsulation, including stream identification, the sequence number decode/encode function, and the sequence recovery function as described with respect to FIG. 4A. The stream identification function may identify whether the 802.11 frame has a redundancy tag. The device 501 may examine the first two octets of the 802.2 LLC Header 358 to determine whether the DSAP 366 and the SSAP 368 include the hexadecimal values AA or AB, and whether the OUI 372 includes 000000. If so, the device 501 may examine the first two octets after the 802.2 LLC Header 358 to determine whether the R-Tag EtherType 374 is included, in which case the sequence number encode/decode function may be initiated. The sequence number encode/decode function may insert and extract the sequence number 378 from the frame. The device 501 may shorten the frame by six octets. The sequence number 378 sub-parameter extracted from the SNAP field 360, along with the destination MAC address may be used by the sequence recovery function for frame elimination. If the frame is a duplicated frame, the frame may be eliminated by the sequence recovery function, otherwise, the device 501 may forward the frame as an 802.3 frame to the next hop device (e.g., using the wired connection 322). The TSN encapsulation may include encoding the sequence number 252 (e.g., to match the sequence number 378), filling the reserved field 250 with zeros, inserting the R-Tag EtherType 248 (increasing the MSDU size by six octets), assigning a stream handle sub-parameter a VLAN ID and encoding it into the priority, DE, VLAN ID field 238 of FIG. 2B (the VLAN ID may be determined based on the transmitter's SS ID of the received 802.11 frame and stored in the VLAN ID to SS ID mapping table), and inserting the EtherType and VLAN ID information, thus increasing the size of the MSDU by four octets.

Figure 6:
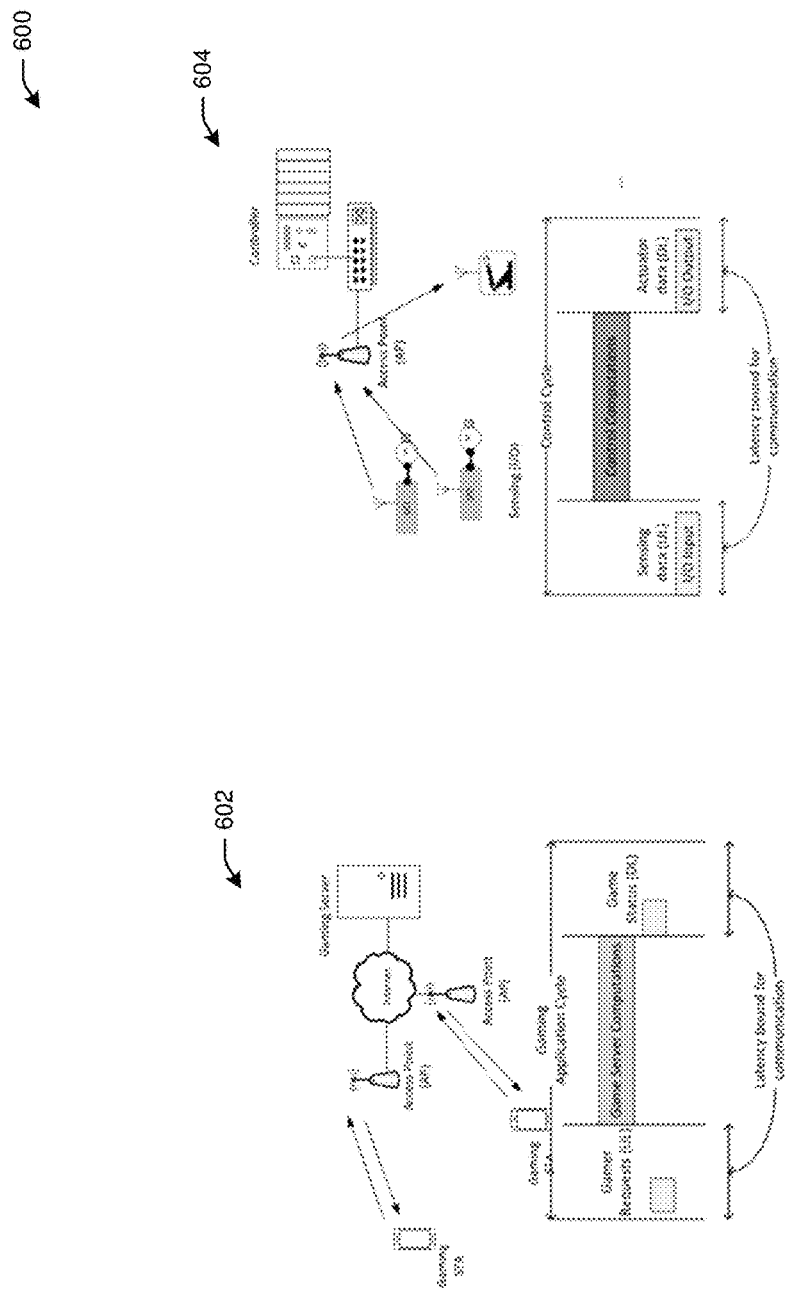
FIG. 6 is a network diagram illustrating example network environments with TSN applications, in accordance with one or more example embodiments of the present disclosure.

FIG. 6 is a network diagram 600 illustrating example network environments with TSN applications, in accordance with one or more example embodiments of the present disclosure.

Referring to FIG. 6, two TSN networks are shown, network 602 for real-time gaming applications and network 604 for an industrial control system.

One of the challenges for next-generation Wi-Fi technology is to support TSN and Real-Time applications (RTA), which require low bounded latency and jitter with high reliability. A Wi-Fi network (AP and clients) may have no mechanism nor interface for applications (upper layers) to request/negotiate a service that delivers data frames with low worst case latency/jitter guarantees. The IEEE 802.11 standard defines admission control procedures (e.g., add traffic stream ADDTS Request/Response), but currently there are no known data delivery requirements and performance expectations including worst case latency and packet delivery ratios in the existing QoS interfaces in the 802.11 specification. There currently is no standard management/control plane interface that enables time-sensitive applications running on a client device or edge server to negotiate a low latency service with a Wi-Fi network. The disclosure herein addresses the gap by defining a low latency service interface to enable future 802.11be solutions to offer and decide whether such service can be provided depending on the deployment, capabilities, and application requirements.

This present disclosure describes a new low latency service interface to the higher layer traffic streams that enables prioritization, delivery of time-sensitive frames within a worst-case latency budget (and jitter) with a negotiated packet delivery ratio (PDR) in 802.11 networks. The present disclosure includes interface inputs/outputs and requirements for applications using the service and 802.11 devices offering it. The interface operating on top of the new 802.11be MLD entity and can minimize the overhead required to establish time-sensitive traffic streams as a single exchange is needed independent of the number of underlying STAs. The interface will enable 802.11 networks to provide bounded latency and jitter with high reliability in managed scenarios, such as enterprise, factories and some homes deployments. This capability is expected to be one of the main new features in 802.11be and will enable TSN services and ultra-reliable low latency communications (URLLC) over 802.11be. Although the present disclosure includes Wi-Fi, the low latency service interface to the upper layers (e.g., application layers) described herein can be extended to other network technologies, such as 5G. The present disclosure provides a service-based solution and does not require kernel driver level changes, meaning it is not device-dependent and could apply to all standard-compliant devices. The present disclosure can be implemented as part of a middleware that could easily be enabled and upgraded/updated without impacting the user applications.

The present disclosure may rely on several premises: 1) A Time-sensitive traffic stream (a higher layer traffic stream with TSN requirements); 2) worst-case latency (e.g., the worst-case latency required for delivering a data frame from one device to another, where the data may not be useful if delivered later than the worst-case latency); and 3) A packet data rate (the percentage of data frames in a time-sensitive traffic stream that are delivered under a worst-case latency).

Figure 7:
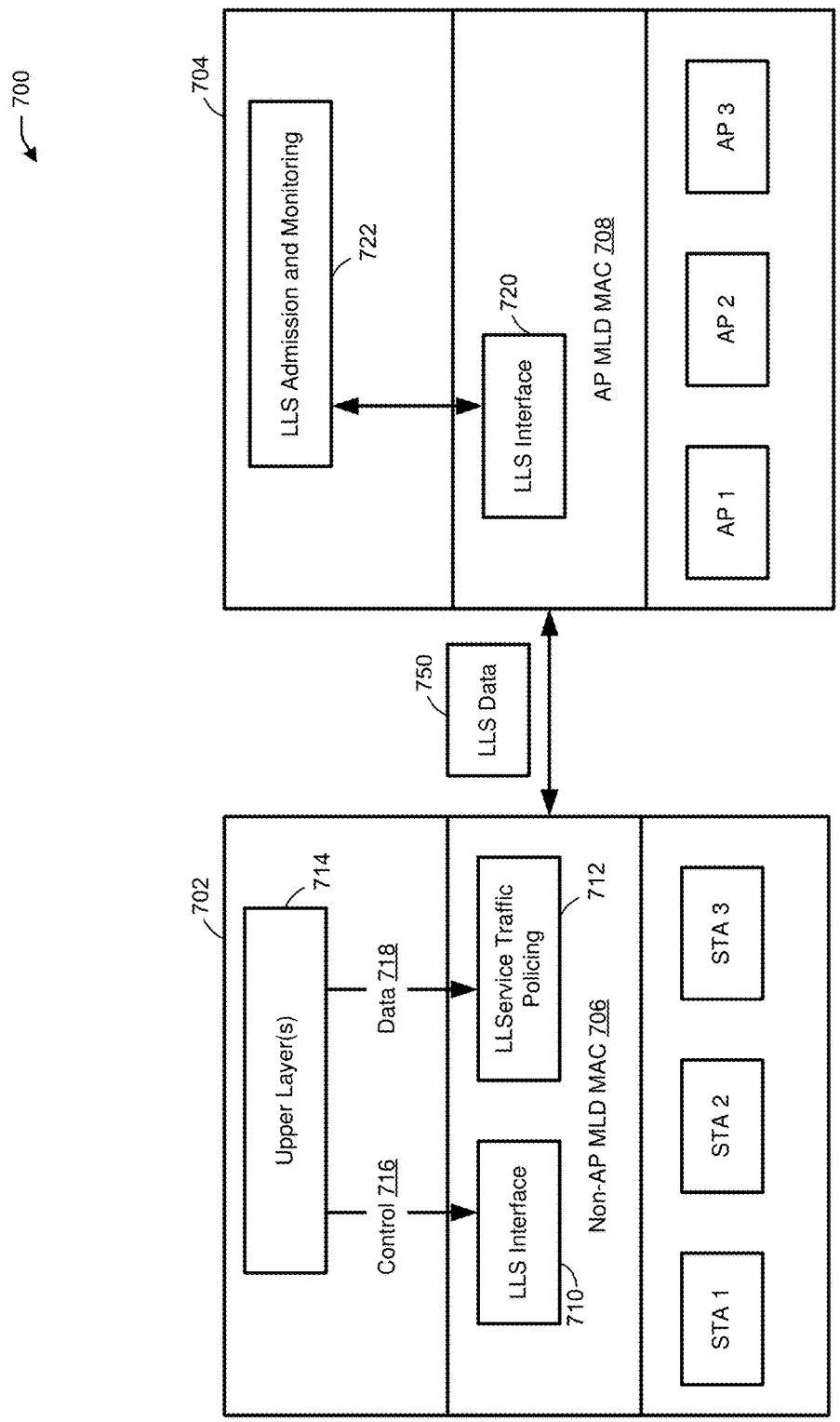
FIG. 7 depicts a schematic diagram of MLDs using low-latency services (LLS), in accordance with one or more example embodiments of the present disclosure.

FIG. 7 depicts a schematic diagram 700 of MLDs using low-latency services (LLS), in accordance with one or more example embodiments of the present disclosure.

Referring to FIG. 7, two MLDs are shown—a non-AP MLD 702 and an AP MLD 704 (e.g., A-MLD). The non-AP MLD 702 may include multiple STAs (e.g., STA 1, STA 2, STA 3) as logical entities (e.g., as described with respect to FIGS. 1B and 1C). The AP MLD 704 may include multiple APs (e.g., AP 1, AP 2, AP3) as logical entities (e.g., as described with respect to FIGS. 1B and 1C). The non-AP MLD 702 may include a non-AP MLD MAC layer 706, and the AP MLD 704 may include an AP MLD MAC layer 708. The non-AP MLD MAC layer 706 may include an LLS interface 710 and an LLService traffic policing module 712. Above the non-AP MLD MAC layer 706 may be upper layers 714 which may exchange control information 716 with the LLS interface 710 and data 718 with the LLService traffic policing module 712. The upper layers 714 (e.g., upper layer processes) may generate a time-sensitive traffic stream. The AP MLD MAC layer 708 may include an LLS interface 720, and above the AP MLD MAC layer 708 may be an LLS admission and monitoring service.

Still referring to FIG. 7, the upper layers 714 of the non-AP MLD 702 may determine the time-sensitive traffic stream parameters, such as the maximum MSDU, the service interval, the delay bound, and others mentioned above. The non-AP MLD 702 may generate and send an LLService.Request primitive (e.g., to the non-AP MLD MAC layer 706) so that the non-AP MLD 702 may send an LLS request (e.g., the LLS data 750, similar to the LLS frames 146 of FIG. 1A) to the AP MLD 704. The AP MLD 704 may receive the LLS request with the requested time-sensitive traffic stream parameters and may determine whether the AP MLD 704 supports those parameters. In particular, once an LLService.Request is received by an 802.11 device (e.g., the non-AP MLD 702), the device may send an ADDTS request (e.g., the LLS data 750) including the service requirements to the AP MLD 704. The AP MLD 704 decides whether to accept, reject or suggest a modification for the requested service. A corresponding status response (e.g., the LLS data 750) may be transmitted to the requesting device with an output of accepted parameters, rejected parameters, or suggested modified parameters.

In one or more embodiments, the LL Service may also be initiated by the AP MLD 704, and in this case, the AP MLD 704 may indicate the service has been established with a response message and admitted traffic parameters. LLService.Notification may refer to a notification from the network (AP) that indicates a change in the status of the service. The AP MLD 704 may send a unsolicited response to the non-AP MLD 702 to change the status of the service. Possible status changes may be termination of the service (e.g. in case the network can no longer provide the required assurance) or modification of the service (e.g. requires a modification of the traffic parameters); The outputs may include: Service status (terminated, modified). Once an LLService.Notification is received by a client with a modified status, the client may send another LLService.Request with the suggested new set of traffic parameters to confirm the acceptance of the new service agreement.

In one or more embodiments, when using MLDs, the LL Service is between the non-AP and AP MLD MAC layers. The device and AP may decide to map the service to any combination of STAs. In one embodiment, multiple STAs within a device (e.g. using different bands) may be used to provide redundant paths for the same stream to increase the reliability. In one embodiment the ADDTS Request/Response frames used to setup a traffic stream across the MLDs used as RA and TA the MAC addresses that identifies the respective MLD management entities. In one embodiment, the ADDTS Request frame contains information whether the TS setup is to be used in links other than the one in which this frame is sent. The information can be the link identifiers or by default all links established between this STA and AP MLD. In one embodiment the STA MLD may send multiple ADDTS Request frames on different links for the same traffic stream; each ADDTS Request frame may contain signaling to allow the AP MLD to determine that each of these ADDTS Requests is for the same traffic stream. In one embodiment, the ADDTS Response frame contains information whether the TS setup is established for links other than the one in which this frame is sent. The information can be the link identifiers or by default all links established between this STA and AP MLD. The ADDTS Response frame may further contain fields to signal that the AP MLD may duplicate packets for this TSID on multiple links.

In one or more embodiments, once the LL service is granted for a given traffic stream, the LL Service traffic policing module 712 monitors the traffic received from the upper layer process for the corresponding stream to ensure the traffic conforms with the accepted traffic parameters. For instance, the LLService Traffic Policing module 712 may detect that the rate of MDSUs for the given stream is higher than expected, and it can issue a response through the LLS Interface 710 terminating the service. The decision on terminating the service may be based on any violation of the agreed traffic parameters. This module will ensure that applications comply with their requirements to receive the service. In another embodiment, the LL Service Traffic Policing module 712 may decide to drop packets from a traffic stream in order to comply with the service requirements and inform the upper layers 714, but without terminating the service. If the compliance is not achieved after a certain grant time, the service may be terminated by the LL Service traffic policing module 712.

In one or more embodiments, the AP MLD 704 may be the ultimate decision maker on the admission control process and it also may monitor the network conditions to manage all admitted traffic streams and decide on future requests. A Low Latency Service Admission and Monitoring function 722 performs these tasks on the AP side. This module may also include the LL Service Traffic Policing capabilities, or it may be implemented as a separate module in the AP. If the traffic policing module detects that the traffic stream is not following the initial parameters agreed in the admission control, it may inform the AP, which may decide to terminate the service. In one embodiment, the AP may forward the admission control request to other network management entities (e.g. a network controller that manages multiple APs), which may have a broader view of the network conditions and can make a better admission decision.

In one or more embodiments, in order to preserve the low latency service during mobility, a service transfer negotiation may be established between neighboring APs to ensure that the tight latency and reliability requirements are maintained. In one embodiment, a proactive negotiation may be established between relevant neighboring APs once the time-sensitive traffic stream is admitted. In this agreement, neighboring APs will have information about the traffic requirements and can prepare to serve the traffic in case the handoff to neighboring cell is required. In another embodiment, the low latency service is pre-admitted to all neighboring APs. The admission decision may be taken by a broader network controller that manages multiple APs. Alternatively, each AP may decide on the pre-admission of a traffic stream and inform the originating client and AP of the request status. If the traffic stream is pre-admitted, the client device receives preferential service in all APs as handoff is performed. Fast handoff techniques can be used to reduce the latency in the transition. The focus here is on ensuring the service agreement is preserved once a device transitions between APs.

In one or more embodiments, the APs supporting the low latency service may advertise the service by including an indication in its beacon frame (e.g., the beacons 144 of FIG. 1A). In one embodiment, the reserved bit (B7 in Table 1 above) in the QoS Information field can be used to indicate the LL service is supported by the AP.

Figure 8A:
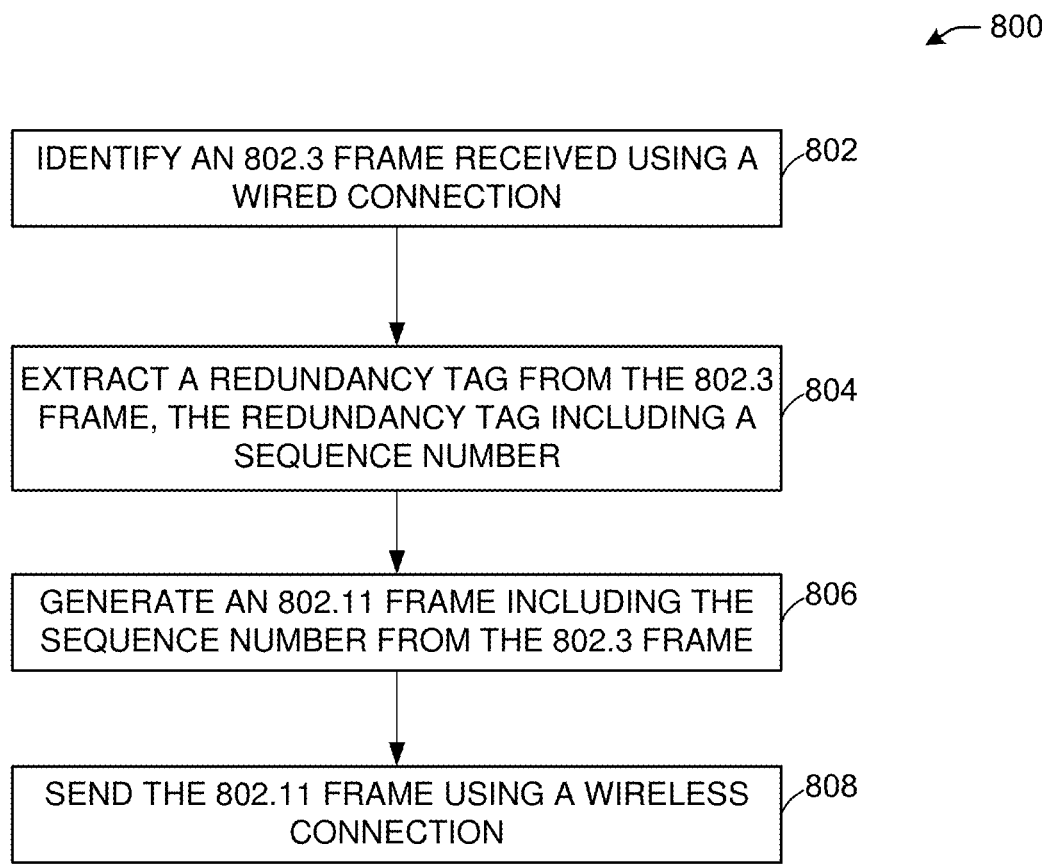
FIG. 8A illustrates a flow diagram of illustrative process for using time sensitive networking, in accordance with one or more example embodiments of the present disclosure.

FIG. 8A illustrates a flow diagram of illustrative process 800 for using time sensitive networking, in accordance with one or more example embodiments of the present disclosure.

At block 802, a device (e.g., the relay 310 of FIG. 3A) may identify an 802.3 Ethernet frame (e.g., the Ethernet frames 140 of FIG. 1A) from a second device (e.g., the relay 310 or the device 302 of FIG. 3A) using a wired connection (e.g., the wired connection 322 of FIG. 3A). The device may have an 802.3 protocol stack (e.g., the 802.3 protocol stack 502 of FIG. 5A) for processing 802.3 frames and performing encapsulation/decapsulation, and for generating 802.3 frames, and may have an 802.11 protocol stack (e.g., the 802.11 protocol stack 504 of FIG. 5A) for processing 802.11 frame and performing encapsulation/decapsulation, and for generating 802.11 frames.

At block 804, the device may identify and extract a redundancy tag (e.g., the redundancy tag 240 of FIG. 2B) from the 802.3 frame. For example, using the 802.3 protocol stack 502 of FIG. 5A, the device may evaluate the redundancy tag to determine whether the 802.3 frame is a duplicate of another frame that has the same sequence number as the 802.3 frame. In particular, the redundancy tag may include an indication of an Ethernet type (e.g., the R-Tag EtherType 248 of FIG. 2B) and a sequence number (e.g., the sequence number 252 of FIG. 2B). When the device determines that another received frame included the same sequence number, the device may identify the frame as a duplicate, and may discard the frame. Determining whether the frame is a duplicate may be part of a decapsulation process, including a stream identification, a sequence decoding, and a sequence recovery.

At block 806, the device may generate an 802.11 frame (e.g., the Wi-Fi frames 142 of FIG. 1A) based on the 802.3 frame. Using the 802.11 protocol stack 504 of FIG. 5A, for example, the device may perform encapsulation of a non-duplicate frame. To encapsulate the frame for TSN operations, the device may generate an 802.11 frame, and add to the frame an 802.2 LLC Header and SNAP header (e.g., the 802.2 LLC Header 358 and the SNAP field 360 of FIG. 2B). The SNAP header may include an indication of an Ethernet type, an R-Tag EtherType, and the same sequence number as the 802.3 frame (e.g., the sequence number 378). Based on a VLAN ID of the 802.3 frame, the device may forward the 802.11 frame to a next device.

At block 808, the device may send the 802.11 frame using a wireless connection (e.g., the wireless connection 324 of FIG. 3A). Based on a VLAN ID of the 802.3 frame, the device may forward the 802.11 frame to a next device (e.g., the device 304 of FIG. 3A). The device may have a mapping table to map the VLAN ID to an SS ID of the next device. When the device has multiple Wi-Fi interfaces, the device may replicate the 802.11 frame (e.g., generate two of the same 802.11 frames) and send one over each Wi-Fi interface using a stream splitting function.

In one or more embodiments, while FIG. 8A describes the process 800 starting with the receipt of an 802.3 frame, the reverse of the process may be implemented by the device (e.g., receiving an 802.11 frame, decapsulating the 802.11 frame, encapsulating an 802.3 frame based on the 802.3 frame, and sending the 802.3 frame, as described with respect to FIG. 5B.

Figure 8B:
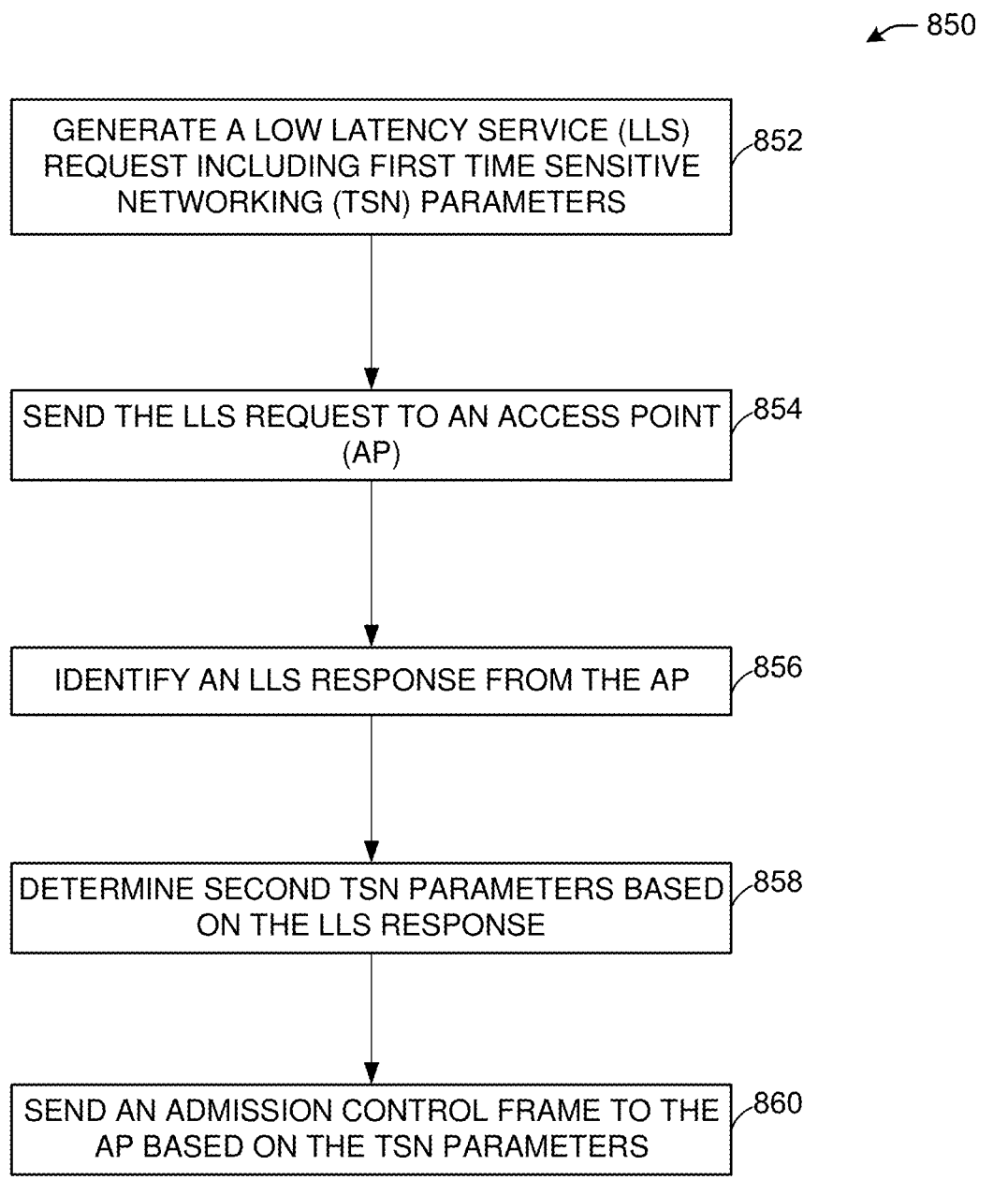
FIG. 8B illustrates a flow diagram of illustrative process for using time sensitive networking, in accordance with one or more example embodiments of the present disclosure.

FIG. 8B illustrates a flow diagram of illustrative process 850 for using time sensitive networking, in accordance with one or more example embodiments of the present disclosure.

At block 852, a device (e.g., the user devices 120 of FIG. 1A, the non-AP MLD 702 of FIG. 7) may generate a LLS request including first TSN parameters. The LLS request may be an LLS request primitive initiated by upper (e.g., application) layers of the device, and the first TSN parameters may include maximum MSDU size, service profile, latency bound, packet delivery ration, and others as described further herein. At block 854, the device may send an LLS request (e.g., the LLS frames 146 of FIG. 1A, the LLS data 750 of FIG. 7) to an AP (e.g., the AP 102 of FIG. 1, the AP MLD 704 of FIG. 7). The request may include the requested TSN parameters to allow the AP to determine whether the AP can support the parameters. The AP may agree to the parameters, reject the parameters, or propose alternative parameters.

At block 856, the device may identify an LLS response from the AP (e.g., the LLS frames 146 of FIG. 1A, the LLS data 750 of FIG. 7) indicating whether the AP has agreed to the requested parameters, rejected the parameters, or proposed alternative parameters. At block 858, the device may determine second TSN parameters based on the LLS response. When the LLS response indicates that the requested TSN parameters were agreed to, the second TSN parameters may be the same as the first TSN parameters. When the AP proposes modified TSN parameters, the device may accept the modified TSN parameters as the second TSN parameters.

At block 860, the device and the AP may perform an admission control procedure as defined by the IEEE 802.11 procedures. The device may send an admission control request to the AP, and the AP may respond with an admission control response indicating whether the device may use a requested traffic stream. The admission control exchange of frames may use the accepted second TSN parameters.

FIG. 9 shows a functional diagram of an exemplary communication station 900, in accordance with one or more example embodiments of the present disclosure. In one embodiment, FIG. 9 illustrates a functional block diagram of a communication station that may be suitable for use as an AP 102 (FIG. 1A) or a user device 120 (FIG. 1A) in accordance with some embodiments. The communication station 900 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 900 may include communications circuitry 902 and a transceiver 910 for transmitting and receiving signals to and from other communication stations using one or more antennas 901. The communications circuitry 902 may include circuitry that can operate the physical layer (PHY) communications and/or medium access control (MAC) communications for controlling access to the wireless medium, and/or any other communications layers for transmitting and receiving signals. The communication station 900 may also include processing circuitry 906 and memory 908 arranged to perform the operations described herein. In some embodiments, the communications circuitry 902 and the processing circuitry 906 may be configured to perform operations detailed in the above figures, diagrams, and flows.

In accordance with some embodiments, the communications circuitry 902 may be arranged to contend for a wireless medium and configure frames or packets for communicating over the wireless medium. The communications circuitry 902 may be arranged to transmit and receive signals. The communications circuitry 902 may also include circuitry for modulation/demodulation, upconversion/downconversion, filtering, amplification, etc. In some embodiments, the processing circuitry 906 of the communication station 900 may include one or more processors. In other embodiments, two or more antennas 901 may be coupled to the communications circuitry 902 arranged for sending and receiving signals. The memory 908 may store information for configuring the processing circuitry 906 to perform operations for configuring and transmitting message frames and performing the various operations described herein. The memory 908 may include any type of memory, including non-transitory memory, for storing information in a form readable by a machine (e.g., a computer). For example, the memory 908 may include a computer-readable storage device, read-only memory (ROM), random-access memory (RAM), magnetic disk storage media, optical storage media, flash-memory devices and other storage devices and media.

In some embodiments, the communication station 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 900 may include one or more antennas 901. The antennas 901 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 900 may include one or more of a keyboard, a display, a non-volatile memory port, multiple antennas, a graphics processor, an application processor, speakers, and other mobile device elements. The display may be an LCD screen including a touch screen.

Although the communication station 900 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASIC s), radio-frequency integrated circuits (RFICs) and combinations of various hardware and logic circuitry for performing at least the functions described herein. In some embodiments, the functional elements of the communication station 900 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 900 may include one or more processors and may be configured with instructions stored on a computer-readable storage device.

FIG. 10 illustrates a block diagram of an example of a machine 1000 or system upon which any one or more of the techniques (e.g., methodologies) discussed herein may be performed. In other embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a power management device 1032, a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (i.e., drive unit) 1016, a signal generation device 1018 (e.g., a speaker), a TSN device 1019, a network interface device/transceiver 1020 coupled to antenna(s) 1030, and one or more sensors 1028, such as a global positioning system (GPS) sensor, a compass, an accelerometer, or other sensor. The machine 1000 may include an output controller 1034, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1002 for generation and processing of the baseband signals and for controlling operations of the main memory 1004, the storage device 1016, and/or the TSN device 1019. The baseband processor may be provided on a single radio card, a single chip, or an integrated circuit (IC).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

The TSN device 1019 may carry out or perform any of the operations and processes (e.g., process 800 of FIG. 8A, process 850 of FIG. 8B) described and shown above.

It is understood that the above are only a subset of what the TSN device 1019 may be configured to perform and that other functions included throughout this disclosure may also be performed by the TSN device 1019.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device/transceiver 1020 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1020 may include one or more physical jacks (e.g., Ethernet, coaxial, or phone jacks) or one or more antennas to connect to the communications network 1026. In an example, the network interface device/transceiver 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1000 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 11:
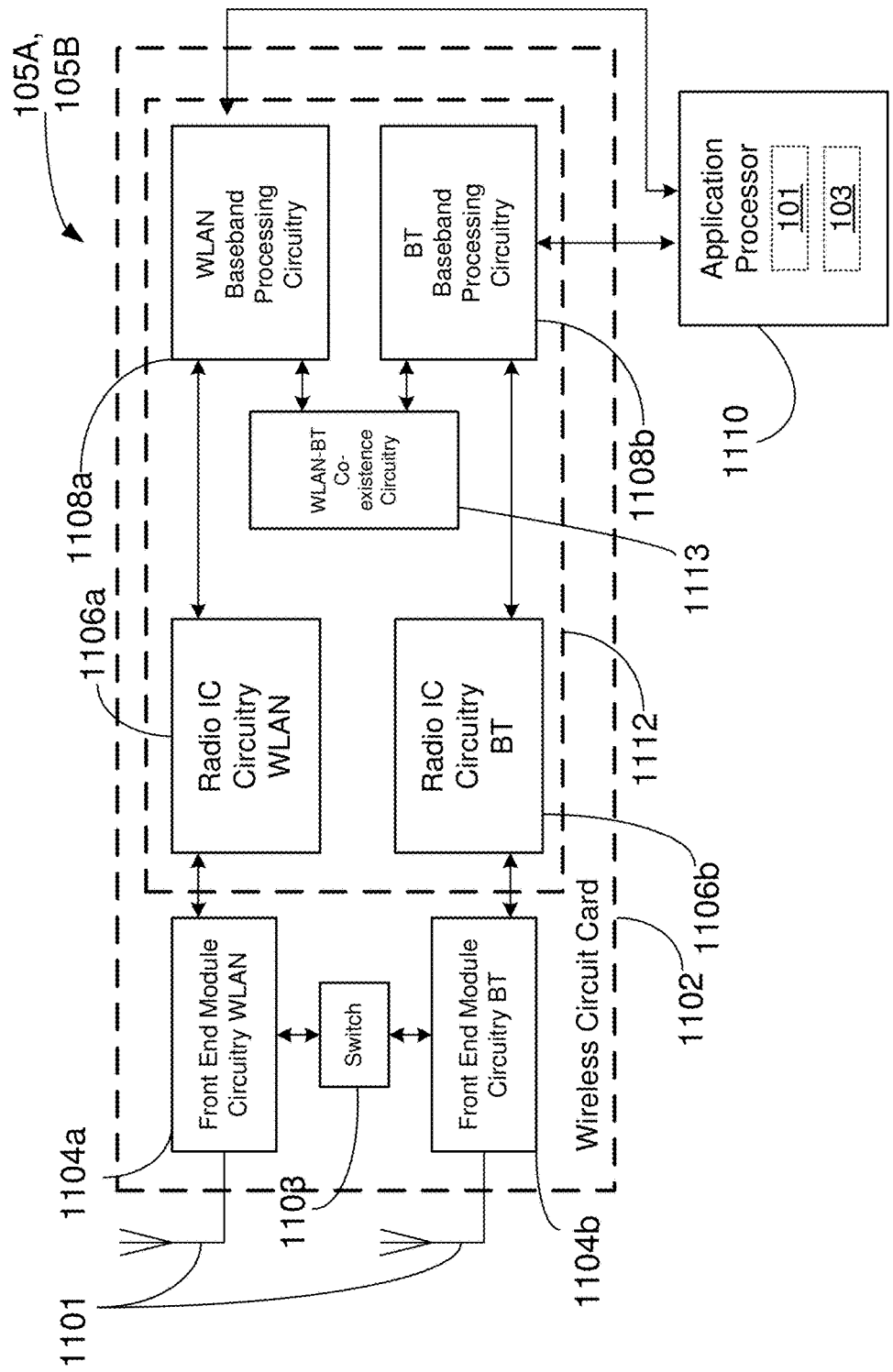
FIG. 11 is a block diagram of a radio architecture in accordance with some examples.

FIG. 11 is a block diagram of a radio architecture 105A, 105B in accordance with some embodiments that may be implemented in any one of the example AP 102 and/or the example STA 120 of FIG. 1A. Radio architecture 105A, 105B may include radio front-end module (FEM) circuitry 1104a-b, radio IC circuitry 1106a-b and baseband processing circuitry 1108a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1104a-b may include a WLAN or Wi-Fi FEM circuitry 1104a and a Bluetooth (BT) FEM circuitry 1104b. The WLAN FEM circuitry 1104a may include a receive signal path comprising circuitry configured to operate on WLAN RF signals received from one or more antennas 1101, to amplify the received signals and to provide the amplified versions of the received signals to the WLAN radio IC circuitry 1106a for further processing. The BT FEM circuitry 1104*b* may include a receive signal path which may include circuitry configured to operate on BT RF signals received from one or more antennas 1101, to amplify the received signals and to provide the amplified versions of the received signals to the BT radio IC circuitry 1106*b* for further processing. FEM circuitry 1104*a* may also include a transmit signal path which may include circuitry configured to amplify WLAN signals provided by the radio IC circuitry 1106*a* for wireless transmission by one or more of the antennas 1101. In addition, FEM circuitry 1104*b* may also include a transmit signal path which may include circuitry configured to amplify BT signals provided by the radio IC circuitry 1106*b* for wireless transmission by the one or more antennas. In the embodiment of FIG. 11, although FEM 1104*a* and FEM 1104*b* are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1106*a*-*b* as shown may include WLAN radio IC circuitry 1106*a* and BT radio IC circuitry 1106*b*. The WLAN radio IC circuitry 1106*a* may include a receive signal path which may include circuitry to down-convert WLAN RF signals received from the FEM circuitry 1104*a* and provide baseband signals to WLAN baseband processing circuitry 1108*a*. BT radio IC circuitry 1106*b* may in turn include a receive signal path which may include circuitry to down-convert BT RF signals received from the FEM circuitry 1104*b* and provide baseband signals to BT baseband processing circuitry 1108*b*. WLAN radio IC circuitry 1106*a* may also include a transmit signal path which may include circuitry to up-convert WLAN baseband signals provided by the WLAN baseband processing circuitry 1108*a* and provide WLAN RF output signals to the FEM circuitry 1104*a* for subsequent wireless transmission by the one or more antennas 1101. BT radio IC circuitry 1106*b* may also include a transmit signal path which may include circuitry to up-convert BT baseband signals provided by the BT baseband processing circuitry 1108*b* and provide BT RF output signals to the FEM circuitry 1104*b* for subsequent wireless transmission by the one or more antennas 1101. In the embodiment of FIG. 11, although radio IC circuitries 1106*a* and 1106*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 1108*a*-*b* may include a WLAN baseband processing circuitry 1108*a* and a BT baseband processing circuitry 1108*b*. The WLAN baseband processing circuitry 1108*a* may include a memory, such as, for example, a set of RAM arrays in a Fast Fourier Transform or Inverse Fast Fourier Transform block (not shown) of the WLAN baseband processing circuitry 1108*a*. Each of the WLAN baseband circuitry 1108*a* and the BT baseband circuitry 1108*b* may further include one or more processors and control logic to process the signals received from the corresponding WLAN or BT receive signal path of the radio IC circuitry 1106*a*-*b*, and to also generate corresponding WLAN or BT baseband signals for the transmit signal path of the radio IC circuitry 1106*a*-*b*. Each of the baseband processing circuitries 1108*a* and 1108*b* may further include physical layer (PHY) and medium access control layer (MAC) circuitry, and may further interface with a device for generation and processing of the baseband signals and for controlling operations of the radio IC circuitry 1106*a*-*b*.

Referring still to FIG. 11, according to the shown embodiment, WLAN-BT coexistence circuitry 1113 may include logic providing an interface between the WLAN baseband circuitry 1108*a* and the BT baseband circuitry 1108*b* to enable use cases requiring WLAN and BT coexistence. In addition, a switch 1103 may be provided between the WLAN FEM circuitry 1104*a* and the BT FEM circuitry 1104*b* to allow switching between the WLAN and BT radios according to application needs. In addition, although the antennas 1101 are depicted as being respectively connected to the WLAN FEM circuitry 1104*a* and the BT FEM circuitry 1104*b*, embodiments include within their scope the sharing of one or more antennas as between the WLAN and BT FEMs, or the provision of more than one antenna connected to each of FEM 1104*a* or 1104*b*.

In some embodiments, the front-end module circuitry 1104*a*-*b*, the radio IC circuitry 1106*a*-*b*, and baseband processing circuitry 1108*a*-*b* may be provided on a single radio card, such as wireless radio card 1102. In some other embodiments, the one or more antennas 1101, the FEM circuitry 1104*a*-*b* and the radio IC circuitry 1106*a*-*b* may be provided on a single radio card. In some other embodiments, the radio IC circuitry 1106*a*-*b* and the baseband processing circuitry 1108*a*-*b* may be provided on a single chip or integrated circuit (IC), such as IC 1112.

In some embodiments, the wireless radio card 1102 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1108b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 12:
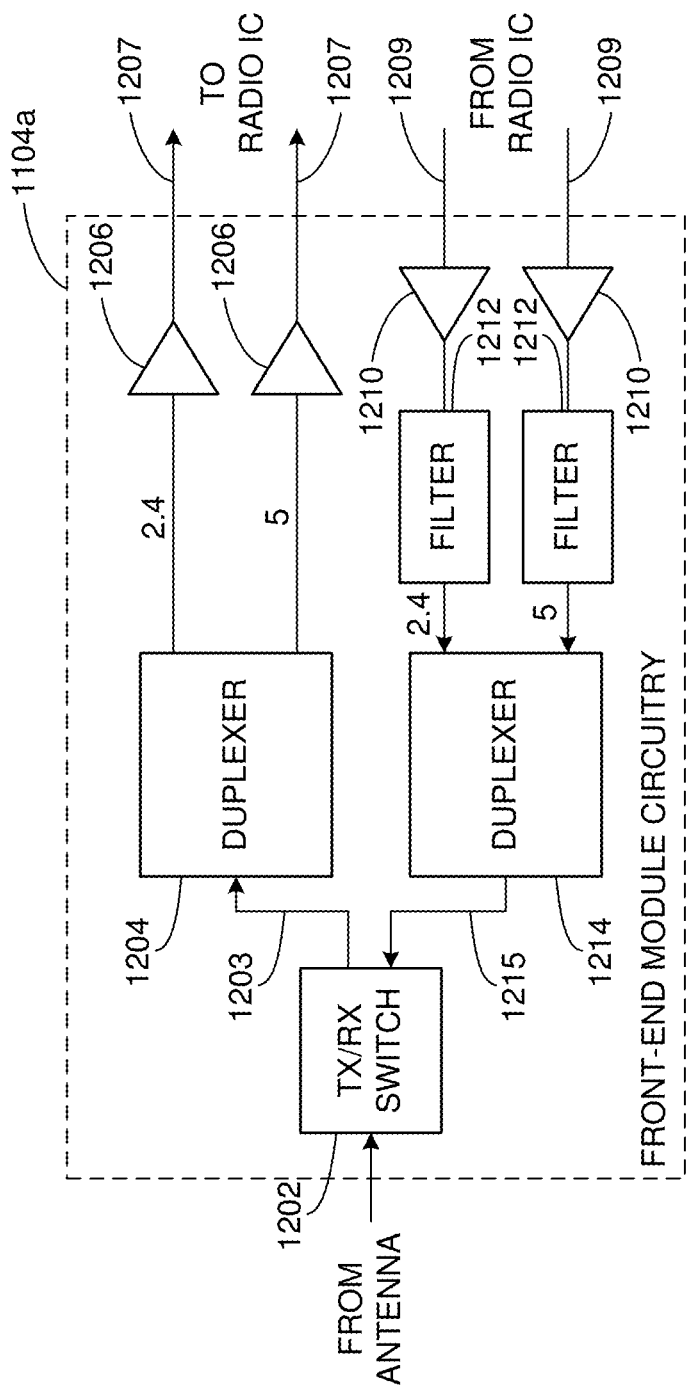
FIG. 12 illustrates an example front-end module circuitry for use in the radio architecture of FIG. 11, in accordance with one or more example embodiments of the present disclosure.

FIG. 12 illustrates WLAN FEM circuitry 1104a in accordance with some embodiments. Although the example of FIG. 12 is described in conjunction with the WLAN FEM circuitry 1104a, the example of FIG. 12 may be described in conjunction with the example BT FEM circuitry 1104b (FIG. 11), although other circuitry configurations may also be suitable.

In some embodiments, the FEM circuitry 1104a may include a TX/RX switch 1202 to switch between transmit mode and receive mode operation. The FEM circuitry 1104a may include a receive signal path and a transmit signal path. The receive signal path of the FEM circuitry 1104a may include a low-noise amplifier (LNA) 1206 to amplify received RF signals 1203 and provide the amplified received RF signals 1207 as an output (e.g., to the radio IC circuitry 1106a-b (FIG. 11)). The transmit signal path of the circuitry 1104a may include a power amplifier (PA) to amplify input RF signals 1209 (e.g., provided by the radio IC circuitry 1106a-b), and one or more filters 1212, such as band-pass filters (BPFs), low-pass filters (LPFs) or other types of filters, to generate RF signals 1215 for subsequent transmission (e.g., by one or more of the antennas 1101 (FIG. 11)) via an example duplexer 1214.

In some dual-mode embodiments for Wi-Fi communication, the FEM circuitry 1104a may be configured to operate in either the 2.4 GHz frequency spectrum or the 5 GHz frequency spectrum. In these embodiments, the receive signal path of the FEM circuitry 1104a may include a receive signal path duplexer 1204 to separate the signals from each spectrum as well as provide a separate LNA 1206 for each spectrum as shown. In these embodiments, the transmit signal path of the FEM circuitry 1104a may also include a power amplifier 1210 and a filter 1212, such as a BPF, an LPF or another type of filter for each frequency spectrum and a transmit signal path duplexer 1204 to provide the signals of one of the different spectrums onto a single transmit path for subsequent transmission by the one or more of the antennas 1101 (FIG. 11). In some embodiments, BT communications may utilize the 2.4 GHz signal paths and may utilize the same FEM circuitry 1104a as the one used for WLAN communications.

Figure 13:
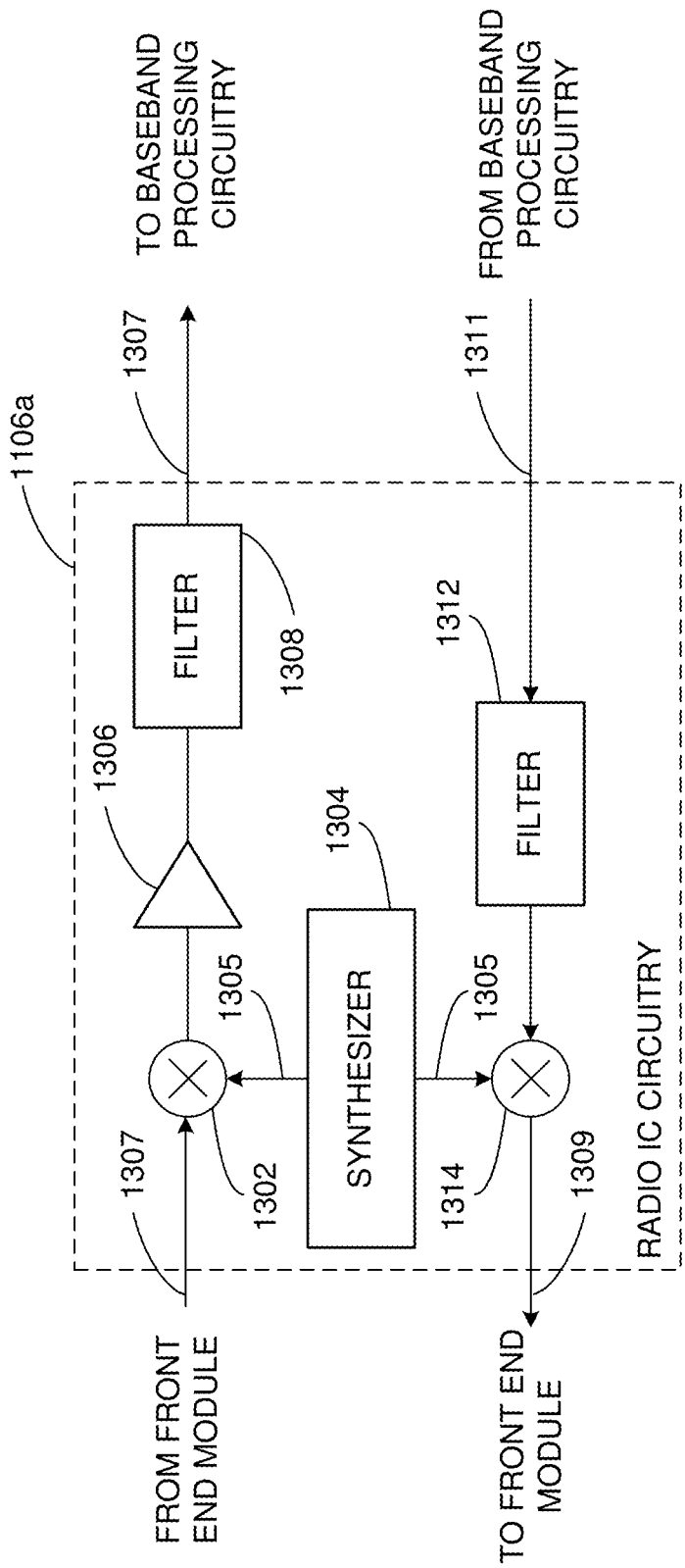
FIG. 13 illustrates an example radio IC circuitry for use in the radio architecture of FIG. 11, in accordance with one or more example embodiments of the present disclosure.

FIG. 13 illustrates radio IC circuitry 1106a in accordance with some embodiments. The radio IC circuitry 1106a is one example of circuitry that may be suitable for use as the WLAN or BT radio IC circuitry 1106a/1106b (FIG. 11), although other circuitry configurations may also be suitable. Alternatively, the example of FIG. 13 may be described in conjunction with the example BT radio IC circuitry 1106b.

In some embodiments, the radio IC circuitry 1106a may include a receive signal path and a transmit signal path. The receive signal path of the radio IC circuitry 1106a may include at least mixer circuitry 1302, such as, for example, down-conversion mixer circuitry, amplifier circuitry 1306 and filter circuitry 1308. The transmit signal path of the radio IC circuitry 1106a may include at least filter circuitry 1312 and mixer circuitry 1314, such as, for example, up-conversion mixer circuitry. Radio IC circuitry 1106a may also include synthesizer circuitry 1304 for synthesizing a frequency 1305 for use by the mixer circuitry 1302 and the mixer circuitry 1314. The mixer circuitry 1302 and/or 1314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 13 illustrates only a simplified version of a radio IC circuitry, and may include, although not shown, embodiments where each of the depicted circuitries may include more than one component. For instance, mixer circuitry 1314 may each include one or more mixers, and filter circuitries 1308 and/or 1312 may each include one or more filters, such as one or more BPFs and/or LPFs according to application needs. For example, when mixer circuitries are of the direct-conversion type, they may each include two or more mixers.

In some embodiments, mixer circuitry 1302 may be configured to down-convert RF signals 1207 received from the FEM circuitry 1104a-b (FIG. 11) based on the synthesized frequency 1305 provided by synthesizer circuitry 1304. The amplifier circuitry 1306 may be configured to amplify the down-converted signals and the filter circuitry 1308 may include an LPF configured to remove unwanted signals from the down-converted signals to generate output baseband signals 1307. Output baseband signals 1307 may be provided to the baseband processing circuitry 1108a-b (FIG. 11) for further processing. In some embodiments, the output baseband signals 1307 may be zero-frequency baseband signals, although this is not a requirement. In some embodiments, mixer circuitry 1302 may comprise passive mixers, although the scope of the embodiments is not limited in this respect.

In some embodiments, the mixer circuitry 1314 may be configured to up-convert input baseband signals 1311 based on the synthesized frequency 1305 provided by the synthesizer circuitry 1304 to generate RF output signals 1209 for the FEM circuitry 1104a-b. The baseband signals 1311 may be provided by the baseband processing circuitry 1108a-b and may be filtered by filter circuitry 1312. The filter circuitry 1312 may include an LPF or a BPF, although the scope of the embodiments is not limited in this respect.

In some embodiments, the mixer circuitry 1302 and the mixer circuitry 1314 may each include two or more mixers and may be arranged for quadrature down-conversion and/or up-conversion respectively with the help of synthesizer 1304. In some embodiments, the mixer circuitry 1302 and the mixer circuitry 1314 may each include two or more mixers each configured for image rejection (e.g., Hartley image rejection). In some embodiments, the mixer circuitry 1302 and the mixer circuitry 1314 may be arranged for direct down-conversion and/or direct up-conversion, respectively. In some embodiments, the mixer circuitry 1302 and the mixer circuitry 1314 may be configured for super-heterodyne operation, although this is not a requirement.

Mixer circuitry 1302 may comprise, according to one embodiment: quadrature passive mixers (e.g., for the in-phase (I) and quadrature phase (Q) paths). In such an embodiment, RF input signal 1207 from FIG. 13 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1305 of synthesizer 1304 (FIG. 13). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1207 (FIG. 12) may comprise a balanced signal, although the scope of the embodiments is not limited in this respect. The I and Q baseband output signals may be provided to low-noise amplifier, such as amplifier circuitry 1306 (FIG. 13) or to filter circuitry 1308 (FIG. 13).

In some embodiments, the output baseband signals 1307 and the input baseband signals 1311 may be analog baseband signals, although the scope of the embodiments is not limited in this respect. In some alternate embodiments, the output baseband signals 1307 and the input baseband signals 1311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1304 may be a fractional-N synthesizer or a fractional N/N+1 synthesizer, although the scope of the embodiments is not limited in this respect as other types of frequency synthesizers may be suitable. For example, synthesizer circuitry 1304 may be a delta-sigma synthesizer, a frequency multiplier, or a synthesizer comprising a phase-locked loop with a frequency divider. According to some embodiments, the synthesizer circuitry 1304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1304 may be provided by a voltage controlled oscillator (VCO), although that is not a requirement. A divider control input may further be provided by either the baseband processing circuitry 1108a-b (FIG. 11) depending on the desired output frequency 1305. In some embodiments, a divider control input (e.g., N) may be determined from a look-up table (e.g., within a Wi-Fi card) based on a channel number and a channel center frequency as determined or indicated by the example application processor 1110. The application processor 1110 may include, or otherwise be connected to, one of the example secure signal converter 101 or the example received signal converter 103 (e.g., depending on which device the example radio architecture is implemented in).

In some embodiments, synthesizer circuitry 1304 may be configured to generate a carrier frequency as the output frequency 1305, while in other embodiments, the output frequency 1305 may be a fraction of the carrier frequency (e.g., one-half the carrier frequency, one-third the carrier frequency). In some embodiments, the output frequency 1305 may be a LO frequency (fLO).

Figure 14:
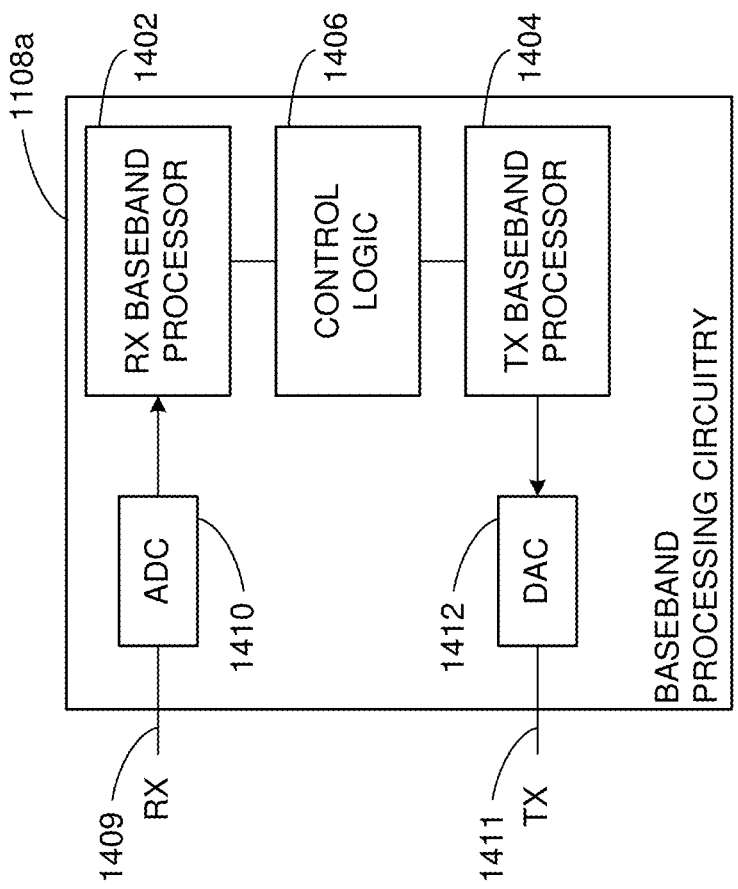
FIG. 14 illustrates an example baseband processing circuitry for use in the radio architecture of FIG. 11, in accordance with one or more example embodiments of the present disclosure.

FIG. 14 illustrates a functional block diagram of baseband processing circuitry 1108a in accordance with some embodiments. The baseband processing circuitry 1108a is one example of circuitry that may be suitable for use as the baseband processing circuitry 1108a (FIG. 11), although other circuitry configurations may also be suitable. Alternatively, the example of FIG. 13 may be used to implement the example BT baseband processing circuitry 1108b of FIG. 11.

The baseband processing circuitry 1108a may include a receive baseband processor (RX BBP) 1402 for processing receive baseband signals 1309 provided by the radio IC circuitry 1106a-b (FIG. 11) and a transmit baseband processor (TX BBP) 1404 for generating transmit baseband signals 1311 for the radio IC circuitry 1106a-b. The baseband processing circuitry 1108a may also include control logic 1406 for coordinating the operations of the baseband processing circuitry 1108a.

In some embodiments (e.g., when analog baseband signals are exchanged between the baseband processing circuitry 1108a-b and the radio IC circuitry 1106a-b), the baseband processing circuitry 1108a may include ADC 1410 to convert analog baseband signals 1409 received from the radio IC circuitry 1106a-b to digital baseband signals for processing by the RX BBP 1402. In these embodiments, the baseband processing circuitry 1108a may also include DAC 1412 to convert digital baseband signals from the TX BBP 1404 to analog baseband signals 1411.

In some embodiments that communicate OFDM signals or OFDMA signals, such as through baseband processor 1108a, the transmit baseband processor 1404 may be configured to generate OFDM or OFDMA signals as appropriate for transmission by performing an inverse fast Fourier transform (IFFT). The receive baseband processor 1402 may be configured to process received OFDM signals or OFDMA signals by performing an FFT. In some embodiments, the receive baseband processor 1402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 11, in some embodiments, the antennas 1101 (FIG. 11) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1101 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MIS 0) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: identify, using an 802.3 protocol stack, an 802.3 frame received from a second device using a wired Ethernet connection; extract, using the 802.3 protocol stack, a redundancy tag from a medium access control (MAC) layer header of the 802.3 frame, the redundancy tag comprising a sequence number; generate, using an 802.11 protocol stack, an 802.11 frame comprising an 802.11 MAC header, an 802.2 logical link control (LLC) header, and a subnetwork access protocol (SNAP) field, the SNAP field comprising an organizationally unique identifier (OUI) and the sequence number, the OUI comprising an indication of an 802.3 protocol; and send the 802.11 frame using a wireless connection.

Example 2 may include the device of example 1 and/or some other example herein, wherein the redundancy tag indicates that the 802.3 frame is an 802.3 frame with a redundancy EtherType protocol enabled.

Example 3 may include the device of example 1 and/or some other example herein, wherein the processing circuitry is further configured to: identify, using the 802.3 protocol stack, a second 802.3 frame received from a third device; extract, using the 802.3 protocol stack, a second redundancy tag from a MAC layer header of the second 802.3 frame, the second redundancy tag comprising the sequence number; determine, using the 802.3 protocol stack, based on the second redundancy tag, that the second 802.3 frame is a duplicate frame of the 802.3 frame; and discard the second 802.3 frame.

Example 4 may include the device of example 1 and/or some other example herein, wherein the processing circuitry is further configured to: identify, using the 802.3 protocol stack, a second 802.3 frame received from a third device; extract, using the 802.3 protocol stack, a second redundancy tag from a MAC layer header of the second 802.3 frame, the second redundancy tag comprising a second sequence number different than the sequence number; generate, using the 802.11 protocol stack, a second 802.11 frame comprising a second SNAP field comprising the second sequence number; and send the second 802.11 frame using the wireless connection and based on the second sequence number being different than the sequence number.

Example 5 may include the device of example 4 and/or some other example herein, wherein the redundancy tag comprises an indication that the 802.3 frame is an Ethernet frame with a redundancy EtherType protocol enabled, and wherein the SNAP field further comprises a second redundancy tag indicative of a Wi-Fi frame.

Example 6 may include the device of example 1 and/or some other example herein, wherein the 802.11 frame is associated with time-sensitive networking (TSN) operations.

Example 7 may include the device of example 1 and/or some other example herein, further comprising a transceiver configured to transmit and receive wireless signals.

Example 8 may include the device of example 7 and/or some other example herein, further comprising an antenna coupled to the transceiver to cause to send the frame.

Example 9 may include a non-transitory computer-readable medium storing computer-executable instructions which when executed by one or more processors result in performing operations comprising: identifying, using an 802.11 protocol stack of a first device, an 802.11 frame received from a second device using a wireless connection; extracting, using the 802.11 protocol stack, an 802.11 MAC header, an 802.2 logical link control (LLC) header, and a subnetwork access protocol (SNAP) field, the SNAP field comprising an organizationally unique identifier (OUI) and a sequence number, the OUI comprising an indication of an 802.3 protocol; generating, using an 802.3 protocol stack of the first device, an 802.3 frame comprising a redundancy tag for a medium access control (MAC) layer header of the 802.3 frame, the redundancy tag comprising a sequence number; and send the 802.3 frame using a wired Ethernet connection.

Example 10 may include the non-transitory computer-readable medium of example 9 and/or some other example herein, wherein the redundancy tag indicates that the 802.3 frame is an 802.3 frame with a redundancy EtherType protocol enabled.

Example 11 may include the non-transitory computer-readable medium of example 9 and/or some other example herein, the operations further including identifying, using the 802.11 protocol stack, a second 802.11 frame received from a third device; extracting, using the 802.11 protocol stack, a second SNAP field from the second 802.11 frame, the second SNAP field comprising the sequence number; determining, using the 802.11 protocol stack, based on the second SNAP field, that the second 802.11 frame is a duplicate of the first 802.11 frame; and discarding the second 802.11 frame.

Example 12 may include the non-transitory computer-readable medium of example 9 and/or some other example herein, the operations further including identifying, using the 802.11 protocol stack, a second 802.11 frame received from a third device; extracting, using the 802.11 protocol stack, a second SNAP field from the second 802.11 frame, the second SNAP field comprising a second sequence number different than the sequence number; generating, using the 802.3 protocol stack, a second 802.3 frame comprising a second redundancy tag comprising the second sequence number; and sending the second 802.3 frame using the wired Ethernet connection and based on the sequence number being different than the sequence number.

Example 13 may include the non-transitory computer-readable medium of example 9 and/or some other example herein, wherein the redundancy tag further comprises an indication that the 802.3 frame is an Ethernet frame with a redundancy EtherType protocol enabled, and wherein the SNAP field further comprises a redundancy tag indicative of an Wi-Fi frame with a redundancy EtherType protocol enabled.

Example 14 may include the non-transitory computer-readable medium of example 9 and/or some other example herein, wherein the 802.11 frame is associated with time-sensitive networking (TSN) operations.

Example 15 may include a method comprising: generating, using an 802.11 protocol stack of a first device, a first 802.11 frame comprising a first 802.11 medium access control (MAC) header, a first 802.2 logical link control (LLC) header, and a first subnetwork access protocol (SNAP) field, the first SNAP field comprising a first organizationally unique identifier (OUI) and a first sequence number associated with a first 802.3 frame, the first OUI comprising a first indication of a redundancy EtherType protocol; generating, using the 802.11 protocol stack, a second 802.11 frame comprising a second 802.11 MAC header, a second 802.2 LLC header, and a second SNAP field, the second SNAP field comprising a second OUI and the first sequence number, the second OUI comprising a second indication of the redundancy EtherType protocol; sending the first 802.11 frame using a first wireless connection; and sending the second 802.11 frame using a second wireless connection.

Example 16 may include the method of example 15 and/or some other example herein, further comprising identifying, using an 802.3 protocol stack of the first device, an 802.3 frame received from a second device using a wired Ethernet connection; and extracting, using the 802.3 protocol stack, a redundancy tag from a MAC layer header of the 802.3 frame, the redundancy tag comprising the sequence number, wherein the redundancy tag indicates that the 802.3 frame is an 802.3 frame with a redundancy EtherType protocol enabled.

Example 17 may include the method of example 16 and/or some other example herein, further comprising: identifying, using the 802.3 protocol stack, a second 802.3 frame received from a third device; extracting, using the 802.3 protocol stack, a second redundancy tag from a MAC layer header of the second 802.3 frame, the second redundancy tag comprising the sequence number; determine, using the 802.3 protocol stack, based on the second redundancy tag, that the second 802.3 frame is a duplicate of the first 802.3 frame; and discard the second 802.3 frame.

Example 18 may include the method of example 16 and/or some other example herein, further comprising: further comprising: identifying, using the 802.3 protocol stack, a second 802.3 frame received from a third device; extracting, using the 802.3 protocol stack, a second redundancy tag from a MAC layer header of the second 802.3 frame, the second redundancy tag comprising a second sequence number different than the sequence number; generating, using the 802.11 protocol stack, a second 802.11 frame comprising a second SNAP field comprising the second sequence number; and sending the second 802.11 frame using the wireless connection and based on the second sequence number being different than the sequence number.

Example 19 may include the method of example 16 and/or some other example herein, wherein the redundancy tag comprises an indication that the 802.3 frame is an Ethernet frame with a redundancy EtherType protocol enabled, and wherein the SNAP field further comprises a second redundancy tag indicative of a Wi-Fi frame with redundancy EtherType protocol enabled.

Example 20 may include the method of example 15 and/or some other example herein, wherein the 802.11 frame is associated with time-sensitive networking (TSN) operations.

Example 21 may include an apparatus comprising means for: generating, using an 802.11 protocol stack, a first 802.11 frame comprising a first 802.11 medium access control (MAC) header, a first 802.2 logical link control (LLC) header, and a first subnetwork access protocol (SNAP) field, the first SNAP field comprising a first organizationally unique identifier (OUI) and a first sequence number associated with a first 802.3 frame, the first OUI comprising a first indication of a redundancy EtherType protocol; generating, using the 802.11 protocol stack, a second 802.11 frame comprising a second 802.11 MAC header, a second 802.2 LLC header, and a second SNAP field, the second SNAP field comprising a second OUI and the first sequence number, the second OUI comprising a second indication of the redundancy EtherType protocol; sending the first 802.11 frame using a first wireless connection; and sending the second 802.11 frame using a second wireless connection.

Example 22 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 23 may include an apparatus comprising logic, modules, and/or circuitry to perform one or more elements of a method described in or related to any of examples 1-21, or any other method or process described herein.

Example 24 may include a method, technique, or process as described in or related to any of examples 1-21, or portions or parts thereof.

Example 25 may include an apparatus comprising: one or more processors and one or more computer readable media comprising instructions that, when executed by the one or more processors, cause the one or more processors to perform the method, techniques, or process as described in or related to any of examples 1-21, or portions thereof.

Example 26 may include a method of communicating in a wireless network as shown and described herein.

Example 27 may include a system for providing wireless communication as shown and described herein.

Example 28 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising
  processing circuitry coupled to storage, the processing circuitry configured to:
    identify, using an 802.3 protocol stack, an 802.3 frame received from a second device using a wired Ethernet connection;
    extract, using the 802.3 protocol stack, a redundancy tag from a medium access control (MAC) layer header of the 802.3 frame,
    the redundancy tag comprising a sequence number;
    generate, using an 802.11 protocol stack, an 802.11 frame comprising
      an 802.11 MAC header,
      an 802.2 logical link control (LLC) header, and
      a subnetwork access protocol (SNAP) field,
      the SNAP field comprising
        an organizationally unique identifier (OUI) and the sequence number,
        the OUI comprising an indication of an 802.3 protocol; and
    send the 802.11 frame using a wireless connection.

2. The device of claim 1,
  wherein the redundancy tag indicates that the 802.3 frame is an 802.3 frame with a redundancy EtherType protocol enabled.

3. The device of claim 1, wherein the processing circuitry is further configured to:
  identify, using the 802.3 protocol stack, a second 802.3 frame received from a third device;
  extract, using the 802.3 protocol stack, a second redundancy tag from a MAC layer header of the second 802.3 frame,
    the second redundancy tag comprising the sequence number;
  determine, using the 802.3 protocol stack, based on the second redundancy tag, that the second 802.3 frame is a duplicate frame of the 802.3 frame; and
  discard the second 802.3 frame.

4. The device of claim 1, wherein the processing circuitry is further configured to:
  identify, using the 802.3 protocol stack, a second 802.3 frame received from a third device;
  extract, using the 802.3 protocol stack, a second redundancy tag from a MAC layer header of the second 802.3 frame,
    the second redundancy tag comprising a second sequence number different than the sequence number;
  generate, using the 802.11 protocol stack, a second 802.11 frame comprising a second SNAP field comprising the second sequence number; and
  send the second 802.11 frame
    using the wireless connection and
    based on the second sequence number being different than the sequence number.

5. The device of claim 1,
  wherein the redundancy tag comprises an indication that the 802.3 frame is an Ethernet frame with a redundancy EtherType protocol enabled, and
  wherein the SNAP field further comprises a second redundancy tag indicative of a Wi-Fi frame.

6. The device of claim 1,
  wherein the 802.11 frame is associated with time-sensitive networking (TSN) operations.

7. The device of claim 1, further comprising
  a transceiver configured to transmit and receive wireless signals comprising at least one of the 802.3 frame or the 802.11 frame.

8. The device of claim 7, further comprising
  an antenna coupled to the transceiver to cause to send the frame.

9. A method comprising:
  generating, using an 802.11 protocol stack of a first device, a first 802.11 frame comprising
    a first 802.11 medium access control (MAC) header,
    a first 802.2 logical link control (LLC) header, and
    a first subnetwork access protocol (SNAP) field,
    the first SNAP field comprising
      a first organizationally unique identifier (OUI) and
      a first sequence number associated with a first 802.3 frame, the first OUI comprising a first indication of a redundancy EtherType protocol;
generating, using the 802.11 protocol stack, a second 802.11 frame comprising
a second 802.11 MAC header,
a second 802.2 LLC header, and
a second SNAP field,
the second SNAP field comprising
a second OUI and
the first sequence number,
the second OUI comprising a second indication of the redundancy EtherType protocol;
sending the first 802.11 frame using a first wireless connection; and
sending the second 802.11 frame using a second wireless connection.

10. The method of claim 9, further comprising:
identifying, using an 802.3 protocol stack of the first device, an 802.3 frame received from a second device using a wired Ethernet connection; and
extracting, using the 802.3 protocol stack, a redundancy tag from a MAC layer header of the 802.3 frame,
the redundancy tag comprising the sequence number,
wherein the redundancy tag indicates that the 802.3 frame is an 802.3 frame with a redundancy EtherType protocol enabled.

11. The method of claim 10, further comprising:
identifying, using the 802.3 protocol stack, a second 802.3 frame received from a third device;
extracting, using the 802.3 protocol stack, a second redundancy tag from a MAC layer header of the second 802.3 frame,
the second redundancy tag comprising the sequence number;
determine, using the 802.3 protocol stack, based on the second redundancy tag, that the second 802.3 frame is a duplicate of the first 802.3 frame; and
discard the second 802.3 frame.

12. The method of claim 10, further comprising:
identifying, using the 802.3 protocol stack, a second 802.3 frame received from a third device;
extracting, using the 802.3 protocol stack, a second redundancy tag from a MAC layer header of the second 802.3 frame,
the second redundancy tag comprising a second sequence number different than the sequence number;
generating, using the 802.11 protocol stack, a second 802.11 frame comprising a second SNAP field comprising the second sequence number; and
sending the second 802.11 frame
using the wireless connection and
based on the second sequence number being different than the sequence number.

13. The method of claim 10,
wherein the redundancy tag comprises an indication that the 802.3 frame is an Ethernet frame with a redundancy EtherType protocol enabled, and
wherein the SNAP field further comprises a second redundancy tag indicative of a Wi-Fi frame with redundancy EtherType protocol enabled.

14. The method of claim 9,
wherein the 802.11 frame is associated with time-sensitive networking (TSN) operations.

* * * * *